United States Patent
Hirabayashi et al.

[11] Patent Number: 6,007,174
[45] Date of Patent: Dec. 28, 1999

[54] INK JET RECORDING APPARATUS AND METHOD

[75] Inventors: Hiromitsu Hirabayashi, Yokohama; Koji Terasawa, Mitaka; Makoto Takemura; Kenjiro Watanabe, both of Tokyo; Shigeyasu Nagoshi, Kawasaki; Hideo Fukazawa, Yokohama; Atsushi Arai, Kawasaki; Yuji Akiyama, Yokohama; Hitoshi Sugimoto, Kawasaki; Miyuki Matsubara, Tokyo; Jiro Moriyama, Kawasaki; Toshiharu Inui, Yokohama, all of Japan

[73] Assignee: Canon Kabushiki Kaisha, Tokyo, Japan

[21] Appl. No.: 08/174,694

[22] Filed: Dec. 27, 1993

Related U.S. Application Data

[63] Continuation-in-part of application No. 07/921,326, Jul. 29, 1992, Pat. No. 5,477,246.

[30] Foreign Application Priority Data

| | | | |
|---|---|---|---|
| Jul. 30, 1991 | [JP] | Japan | 3-190347 |
| Jul. 30, 1991 | [JP] | Japan | 3-190350 |
| Sep. 3, 1991 | [JP] | Japan | 3-222877 |
| Dec. 28, 1992 | [JP] | Japan | 4-348353 |

[51] Int. Cl.$^6$ ........................ B41J 2/07
[52] U.S. Cl. .............. 347/14; 347/15; 347/43
[58] Field of Search ............... 347/14, 43, 9, 347/5, 15

[56] References Cited

U.S. PATENT DOCUMENTS

| | | | |
|---|---|---|---|
| 4,050,077 | 9/1977 | Yamanda et al. | 346/75 |
| 4,251,824 | 2/1981 | Hava et al. | 346/140 R |
| 4,682,216 | 7/1987 | Sasaki et al. | 358/79 |
| 4,866,462 | 9/1989 | Watanabe | 347/9 |
| 5,146,236 | 9/1992 | Hirata et al. | 347/12 |
| 5,155,503 | 10/1992 | Tasaki et al. | 347/9 |
| 5,208,605 | 5/1993 | Drake | 347/15 |
| 5,218,376 | 6/1993 | Asai | 346/1.1 |
| 5,237,344 | 8/1993 | Tasaki et al. | 347/9 |

Primary Examiner—Valerie Lund
Attorney, Agent, or Firm—Fitzpatrick, Cella, Harper & Scinto

[57] ABSTRACT

An ink jet recording apparatus comprises a recording head adapted for ejecting at least two colors of ink, a discriminater for discriminating between character data and bit map data, and a controller for selecting a character data recording mode or a bit map data recording mode in accordance with a discrimination result by the discriminater. The controller controls an amount of ink ejection in the bit map data recording mode to be less than that in the character data recording mode.

21 Claims, 38 Drawing Sheets

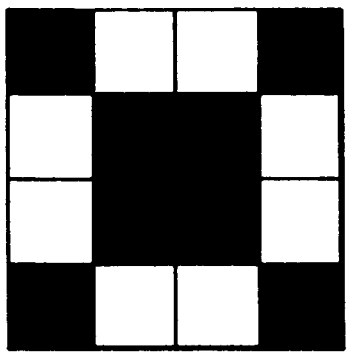
FIG. 3A    ORIGINAL PRINT SIG
FIG. 3B
| 1 | 2 | 1 | 2 |
|---|---|---|---|
| 2 | 1 | 2 | 1 |
| 1 | 2 | 1 | 2 |
| 2 | 1 | 2 | 1 |
THINNING PATTERN
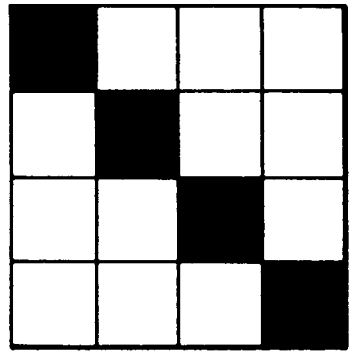
FIG. 3C    THIN PRINT SIG $S_1$
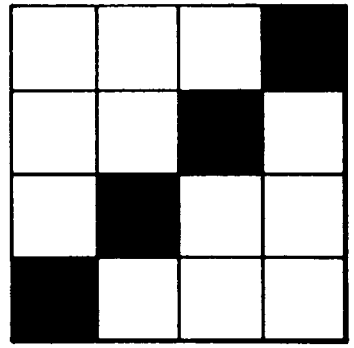
FIG. 3D    THIN PRINT SIG $S_2$

| PRINT MODE | PRINT CONTROL | | | | | | | | TARGET HEAD TEMP | |
|---|---|---|---|---|---|---|---|---|---|---|
| | Bk | | | | C, M, Y | | | | Bk | C, M, Y |
| | 1ST SCAN | 2 | 3 | 4 | 1 | 2 | 3 | 4 | | |
| 1 PASS | S | — | — | — | S | — | — | — | 36°C | 36°C |
| 2 PASS | C | RC | — | — | C | RC | — | — | 40°C | 40°C |
| 4 PASS | C | RC | C | RC | — | — | C | RC | 32°C | 40°C |

P₁ : PREHEAT PULSE (=T₁)(PWM CONTROL)
P₂ : INTERVAL (=T₂-T₁)
P₃ : MAIN HEAT PULSE (=T₃-T₂)
V$_{OP}$ : DRIVING VOLTAGE

FIG. 10

| HEAD TEMP (°C) | TABLE ① $P_1$ ($\mu$s) | TABLE ② $P_1$ ($\mu$s) |
|---|---|---|
| T ≦ 36 | 1.10 | 0.95 |
| 36 < T ≦ 38 | 1.10 | 0.80 |
| 38 < T ≦ 40 | 0.95 | 0.65 |
| 40 < T ≦ 42 | 0.80 | 0.50 |
| 42 < T ≦ 44 | 0.65 | 0.35 |
| 44 < T ≦ 46 | 0.50 | 0.20 |
| 46 < T ≦ 48 | 0.35 | 0.20 |
| 48 < T | 0.20 | 0.20 |

1ST SCAN

FIG. 36

| PRINT MODE | RECORDING HEAD | DENSITY | | |
|---|---|---|---|---|
| | | HIGHER | STANDARD | LOWER |
| COATED PAPER | Bk | 32°C~50°C | 34°C~55°C | 36°C~60°C |
| | C, M, Y | 32°C~50°C | 34°C~55°C | 36°C~60°C |
| OHP PAPER | Bk | 32°C~50°C | 34°C~55°C | 36°C~60°C |
| | C, M, Y | 30°C~50°C | 32°C~50°C | 34°C~55°C |
| REGULAR PAPER BLACK EMPHASIS | Bk | 32°C~50°C | 34°C~55°C | 36°C~60°C |
| | C, M, Y | 30°C~50°C | 32°C~50°C | 34°C~55°C |
| REGULAR PAPER COLOR PRINT | Bk | 30°C~50°C | 32°C~50°C | 34°C~55°C |
| | C, M, Y | 30°C~50°C | 32°C~50°C | 34°C~55°C |

INK JET RECORDING APPARATUS AND METHOD

CROSS-REFERENCE TO RELATED APPLICATION

This application is a continuation-in-part of U.S. application Ser. No. 07/921,326, which was filed on Jul. 29, 1992, now U.S. Pat. No. 5,477,246.

BACKGROUND OF THE INVENTION

1. Field of the Invention

The present invention relates to an ink jet recording apparatus and method and, more particularly, to a recording apparauts and method, which heat a liquid using electro-thermal energy converting elements, and eject liquid droplets.

2. Related Background Art

In recent years, office automation ("OA") equipments such as computers, wordprocessors, copying machines, and the like have become popular, and a large number of recording apparatuses for such equipment have been developed. An ink jet recording apparatus allows easier high-definition recording than other recording methods, and can realize low-noise, low-cost recording at high speed.

An ink jet recording apparatus is designed to have various recording modes in addition to a simple one-scan recording mode so as to solve a problem in fixing characteristics of an ink on recording media such as a paper sheet, an overhead projection ("OHP") film, and the like, and to prevent, e.g., density nonuniformity inherent to recording heads.

Of these recording modes, a multi-pass print mode for performing recording by scanning a single recording head a plurality of number of times for a single area on a recording medium is popularly used for various purposes. In particular, when color recording is performed by a plurality of recording heads using different colors of inks, a thin multi-pass print mode is executed. In this mode, in order to prevent ink overflow and image blur on the recording medium, instead of printing all the recording data at one time, a single scan pattern is thinned out in a checkered pattern, and the checker pattern is recorded a plurality of number of times, thereby finishing an image corresponding to all the recording data. Even in a monochrome recording mode, the following print method as a modification of the thin print multi-pass print mode is executed. For example, in a recording head consisting of a plurality of nozzles, density nonuniformity inherent to the recording head due to a difference in ejection characteristics among the nozzles is often observed. In order to eliminate such nonuniformity, half of all the recording data is printed by a first nozzle group, and the remaining half is printed by a second nozzle group.

In the thin multi-pass print mode, the density of a recorded image tends to become lower than an image obtained when recording is performed at a time without using a thinning pattern (one-pass print mode). The degree of this phenomenon varies depending on the types of recording media. In general, this phenomenon is less likely to occur on coated paper coated with an ink reception layer, and is often observed on non-coated paper such as plain paper copier ("PPC") paper having no special coat. Although the details of the mechanism of this phenomenon are unknown, this phenomenon has a strong correlation with the ink absorption speed of ink reception characteristics, and readily occurs on paper which has poor ink fixing characteristics. Since this phenomenon is associated with ink absorption in a recording medium such as paper, it also has a correlation with the ink composition. Although paper having poor fixing characteristics requires the thin multi-pass print mode, a decrease in density easily occurs on such paper due to the thin multi-pass print mode.

In an ink jet recording method, ink droplets are formed by various methods, and recording is realized by depositing ink droplets onto a recording medium such as paper.

Of recording apparatuses adopting a recording method of this type, as an apparatus having a structure suitable for a high-density multi-orifice recording head, an ink jet recording apparatus of a type utilizing heat as energy for forming ink droplets is known.

The ink jet recording apparatus, which utilizes heat as ink droplet ejection energy, normally comprises a recording head having ink droplet forming means for heating an ink to displace the ink by causing an abrupt increase in the volume of the ink, and ejecting the ink from orifices of a nozzle section, thereby forming ink droplets, i.e., electrothermal energy converting elements, which generate heat upon application of an electrical signal, and which can heat the ink.

In the ink jet recording apparatus, the ink jet characteristics, especially, the ink droplet size, are influenced by the temperature of the recording head, and the print density changes depending on the temperature. Thus, temperature control for, e.g., maintaining a constant temperature of the recording head is performed.

FIG. 22 shows an ink jet printer head for heating an ink by a heater to generate bubbles, and ejecting ink droplets in response to the bubbles, and in particular, shows details of an ejection element 58 as the principal part of the head.

Heaters $H_1$ 65 and $H_2$ 66 used for heating the head and keeping the head temperature are formed on an Si substrate 61 from the same material as that of ejection heaters 63. Energization of the heaters $H_1$ 65 and $H_2$ 66 is ON-OFF-controlled according to head temperature information from a temperature detection means (thermistor 59) mounted on a base plate 53, thereby controlling the head temperature. Orifices 62 for ejecting ink communicate with corresponding nozzles 64. The nozzles 64 are supplied with ink from an ink tank (not shown) through an ink chamber 68. A filter 69 is arranged on the ink chamber 68. The heaters 63, 65, and 66 are connected to an electrical circuit board 54 via an Al wiring pattern 67 and bonding wires 70.

However, since the ink jet recording head for ejecting ink droplets by utilizing heat energy generates heat by itself upon recording, the ink temperature in each nozzle where the ejection heater is arranged is higher than a temperature detected by the temperature detection means during recording, and this temperature difference varies depending on the recording pattern and the record density. For this reason, when data having a high record density such as an image pattern is to be recorded, the ink temperature in the nozzles is increased, and the print density is increased accordingly. On the other hand, when data having a relatively low record density such as a character pattern is to be recorded, the print density is lowered. It is therefore difficult to always obtain a uniform print density.

When an image pattern is recorded, a multi-pass print operation for performing one-line recording for a plural number of times of carriage scan operations is often performed so as to improve image quality (color boundary blur, color misregistration, and the like). In this case, the print density may vary due to a difference in head temperature rise caused by different print densities in respective scan operations. When the print density in each scan operation varies, the ink penetration state onto a recording medium varies. In general, as compared to a case wherein the print density is increased by a one-pass print method, when an ink is printed a plurality of number of times at a low print density, the spread of each ink droplet on a recording medium is decreased, and the apparent print density is undesirably lowered.

The demand for an ink jet recording apparatus capable of performing color recording is increasing. Such a recording apparatus uses a recording head having an array of a plurality of recording elements obtained by integrating a plurality of ink ejection orifices and nozzles. Some recording apparatuses have a plurality of recording heads for respectively ejecting cyan, magenta, yellow, and black inks for color recording. The ink ejection orifices of such a recording head eject ink in almost an equal quantity per pixel.

However, the ink ejection quantity is considerably influenced by the temperature of the recording head. More specifically, when the temperature of the recording head is high, the ejection quantity is increased; when the temperature of the recording head is low, the ejection quantity is decreased. Such a difference in ejection quantity largely influences the density of a printed image. In order to stabilize the ejection quantity independently of the environmental condition of the recording head, temperature control must be performed for each recording head.

For this purpose, a temperature control heater is arranged near or in the recording head in addition to ink ejection heaters, and the temperature of the recording head is detected by a thermistor. The detected temperature is fed back to a control mechanism to stabilize the ink ejection quantity, thereby obtaining an image free from print density differences and which is independent of the environmental temperature of the recording head. In this case, temperature control is uniformly performed for recording heads. On the other hand, when color recording is performed using ink jet recording heads, the following method is adopted. That is, coated paper having good ink absorbency is used as a recording medium, ink droplets each having a relatively small drop size are ejected onto the coated paper, and inks are absorbed in the coated paper.

When the above-mentioned coated paper is used as the recording medium, a sufficient print density and fixing characteristics can be assured. However, a demand has arisen for a print operation using low-cost regular paper as a recording medium with the recent advent of low-cost information and communication equipment. When a recording apparatus is designed exclusively for coated paper, a user must use expensive recording media, and cannot desirably select other recording media.

Since regular paper has no special treatment for absorption of an ink as a liquid, it cannot easily obtain a sufficient density as compared to coated paper manufactured in consideration of ink absorbency. In particular, the density of a black ink used for characters, ruled lines, and the like is important in an image. Therefore, to obtain a sufficient density is an important subject for the print operation on regular paper.

When temperature control upon ejection is uniformly performed for a plurality of recording heads like in the above-mentioned conventional method to perform a print operation on recording media such as regular paper, OHP paper, and the like having inferior ink absorbency to that of coated paper, since ink droplets to be ejected are set to have a small drop size, as described above, the density of black characters and black lines is low. In addition, since inks are implanted in too great quantities on R (red), G (green), and B (blue) portions obtained by mixing inks ejected from the cyan, magenta, and yellow recording heads so as to obtain a color image, the inks are considerably blurred, thus deteriorating print quality.

Furthermore, since the recording heads suffer from variations in ejection quantity, the print density varies in units of recording heads. As a result, especially in a color recording mode, different color tones are obtained in units of color ink jet recording apparatuses.

SUMMARY OF THE INVENTION

The present invention has been made in consideration of the problems of the related arts, and from a new viewpoint that is not expected in the conventional methods.

Thus, it is the first object of the present invention to provide an ink jet recording apparatus, which can prevent a decrease in density in a thin multi-pass print mode, and can satisfactorily record an image according to the types of recording media.

In order to achieve the above object, an ink jet recording apparatus according to the present invention, comprises print method control means for switching a print mode between a thin multi-pass print mode for controlling the number of times of recording head scan operations for a single recording area, and sequentially performing divided recording data, and a one-pass print mode for recording all recording data in a single head scan operation, and ejection quantity control means for controlling an ink ejection quantity. The ejection quantity control means is controlled so that a total ink quantity per unit recording area in the thin multi-pass print mode is larger than that in the one-pass print mode. Thus, image recording suitable for various recording media can be attained.

It is the second object of the present invention to provide an ink jet recording apparatus, which can eliminate print density differences caused by differences in recording modes.

In order to achieve this object, according to the present invention, an ink jet recording apparatus for performing recording using a recording head for ejecting an ink, comprises discrimination means for discriminating a type of recording data recorded by the recording head, and ejection quantity control means for controlling an ejection quantity of an ink ejected from the recording head according to the type of recording data discriminated by the discrimination means. The target temperature of the recording head is switched according to the recording mode, thereby eliminating print density differences due to a difference in recording modes.

It is the third object of the present invention to provide an ink jet recording method and apparatus, wherein even when a print operation is performed not only on coated paper but also on a recording medium such as regular paper or OHP paper, which has inferior fixing characteristics to that of the coated paper, and cannot obtain a sufficient OD (average optical density), use temperature ranges of recording heads are individually set, so that, in a color recording mode, the print density of black characters is increased, improvement for fixing characteristics and prevention of blur are attained by suppressing ink implantation quantity of a color recording unit, and image recording can be performed with high print quality.

It is the fourth object of the present invention to provide an ink jet recording method and apparatus, wherein print density characteristics of each recording head are measured to set an optimal use temperature range for each recording head.

In order to achieve the above objects, according to the present invention, an ink jet recording apparatus for performing recording using a plurality of recording heads for ejecting inks onto a recording medium, comprises temperature detection means for detecting temperatures of the recording heads, and temperature control means for controlling the temperatures of the recording heads on the basis of the temperature information detected by the temperature detection means so that the temperatures of the recording heads do not fall outside predetermined temperature ranges which are set in correspondence with the recording heads.

According to the present invention, there is also provided an ink jet recording apparatus for performing recording using a plurality of recording heads for ejecting inks onto a recording medium, comprising temperature range setting means for setting temperature ranges of the recording heads for respective recording heads, and control means for controlling temperatures of the recording heads according to the temperature ranges set by the temperature range setting means.

According to the present invention, there is also provided an ink jet recording apparatus for performing recording using a plurality of recording heads for ejecting inks onto a recording medium, comprising temperature range setting means for setting predetermined temperature ranges of the recording heads according to a type of recording medium to be used in units of recording heads.

According to the present invention, there is also provided an ink jet recording method comprising the step of preparing a plurality of recording heads for performing recording by ejecting inks onto a recording medium, and the step of performing recording by controlling temperatures of the recording heads so as not to fall outside predetermined temperature ranges, which are set in correspondence with the recording heads.

According to the present invention, there is also provided an ink jet recording apparatus for performing recording using a plurality of recording heads for ejecting inks onto a recording medium, comprising density detection means for detecting densities of test patterns formed on a recording medium by the recording heads, temperature setting means for setting temperatures of the recording heads for respective recording heads on the basis of the densities of the test patterns detected by the density detection means, and control means for controlling the temperatures of the recording heads according to the temperatures set by the temperature setting means.

BRIEF DESCRIPTION OF THE DRAWINGS

FIGS. 3A to 3D are views for explaining a method of generating thinned print signals;

FIG. 10 shows a PWM table of the second embodiment;

FIG. 36 is a table showing use temperature ranges of the recording heads in units of print modes and density characteristics of the recording heads;

DETAILED DESCRIPTION OF THE PREFERRED EMBODIMENTS

The preferred embodiments of the present invention will be described in detail hereinafter with reference to the accompanying drawings.

The first invention of the present application will be described below.

First Embodiment

Figure 1:
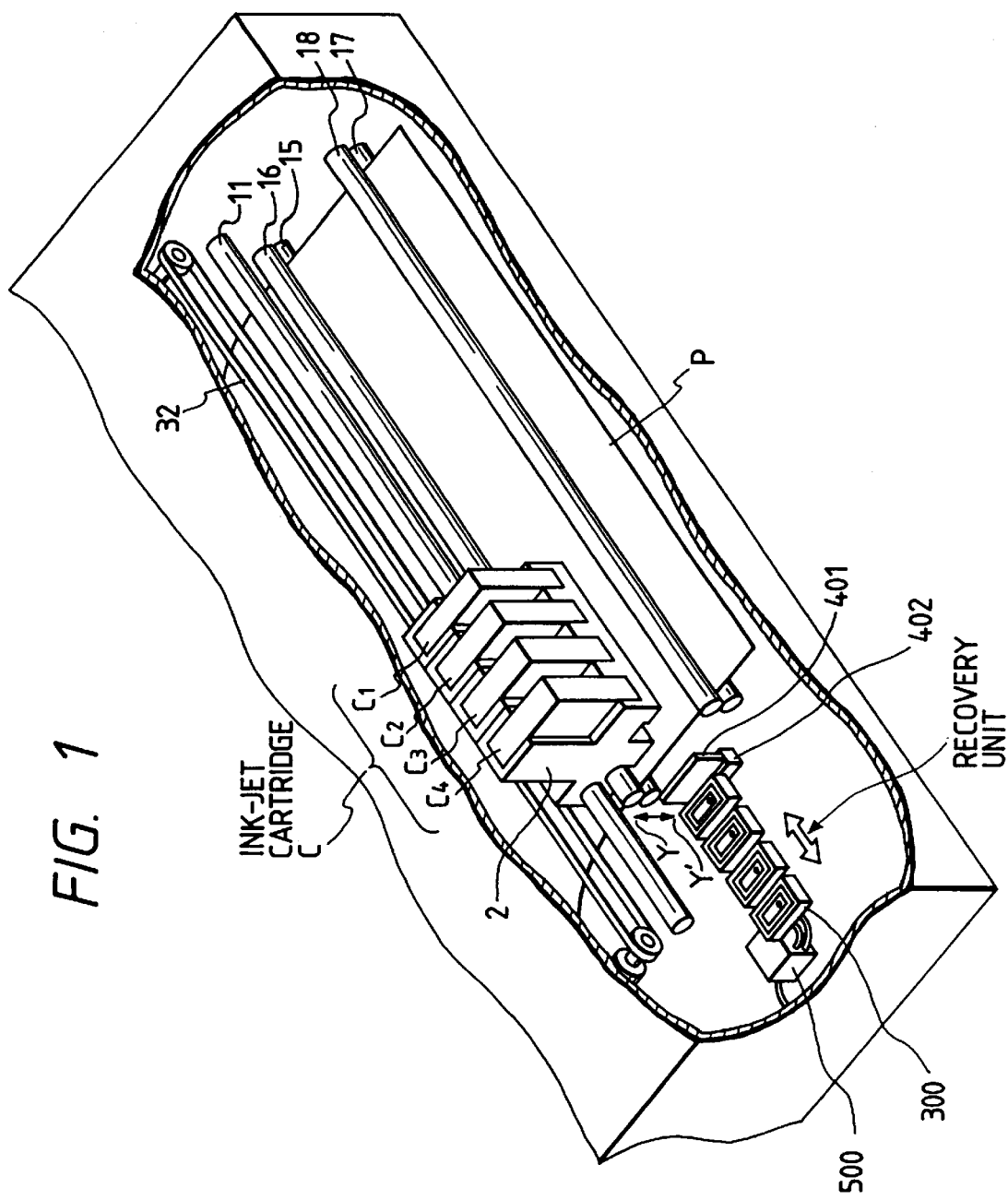
FIG. 1 is a schematic view for explaining an ink jet recording apparatus which can adopt the present invention.

FIG. 1 is a schematic view of an ink jet recording apparatus, which can adopt the present embodiment. An ink jet cartridge C has an ink tank unit in its upper portion, and a recording head 23 (not shown) in its lower portion. The cartridge C also has a connector for receiving signals for driving the recording head 23. A carriage 2 aligns and carries four cartridges C1, C2, C3, and C4 (which store different color inks, e.g., yellow, magenta, cyan, and black inks). The carriage 2 is provided with a connector holder, electrically connected to the recording heads 23, for transmitting, e.g., signals for driving recording heads.

The ink jet recording apparatus includes a scan rail 11, extending in the main scan direction of the carriage 2, for slidably supporting the carriage 2, and a drive belt 32 for transmitting a driving force for reciprocally moving the carriage 2. The apparatus also includes pairs of convey rollers 15 and 16, and 17 and 18, arranged before and after the recording positions of the recording heads, for clamping and conveying a recording medium, and a recording medium P such as a paper sheet, which is urged against a platen (not shown) for flattening a recording surface of the recording medium P. At this time, the recording head 23 of each ink jet cartridge C carried on the carriage 2 projects downward from the carriage, and is located between the convey rollers 16 and 18 for conveying the recording medium. The ejection orifice formation surface of each recording head faces parallel to the recording medium P urged against the guide surface of the platen (not shown). Note that the drive belt 32 is driven by a main scan motor 29, and the pairs of convey rollers 15 to 18 are driven by a sub-scan motor 26 (not shown).

In the ink jet recording apparatus of this embodiment, a recovery system unit is arranged at the home position side (at the left side in FIG. 1). The recovery system unit includes cap units 300 arranged in correspondence with the plurality of ink jet cartridges each having the recording head 23. Upon movement of the carriage 2, the cap units 300 can be slid in the right-to-left direction and be also vertically moved. When the carriage 2 is located at the home position, the cap units 300 are joined to the corresponding recording heads 23 to cap them, thereby preventing an ejection error of the ink in the ejection orifices of the recording heads 23. Such ejection error is caused by evaporation, which results in increased viscosity and solidification of the attached inks.

The recovery system unit also includes a pump unit 500 communicating with the cap units 300. When the recording head 23 causes an ejection error, the pump unit 500 is used for generating a negative pressure in suction recovery processing executed by joining the cap unit 300 and the corresponding recording head 23. Furthermore, the recovery system unit includes a blade 401 as a wiping material formed of an elastic member such as rubber, and a blade holder 402 for holding the blade 401.

In the four ink jet cartridges carried on the carriage 2, the cartridge C1 stores a black (to be abbreviated to as K hereinafter) ink, the cartridge C2 stores a cyan (to be abbreviated to as C hereinafter) ink, the cartridge C3 stores a magenta (to be abbreviated to as M hereinafter) ink, and the cartridge C4 stores a yellow (to be abbreviated to as Y hereinafter) ink. The inks overlap each other in this order. Intermediate colors can be realized by properly overlapping C, M, and Y color ink dots. More specifically, red can be realized by overlapping M and Y; blue, C and M; and green, C and Y. Black can be realized by overlapping three colors C, M, and Y. However, since black realized by overlapping three colors C, M, and Y has poor color development and precise overlapping of three colors is difficult, a chromatic edge is formed, and the ink implantation density per unit time becomes too high. For these reasons, only black is implanted separately (using a black ink).

Figure 2:
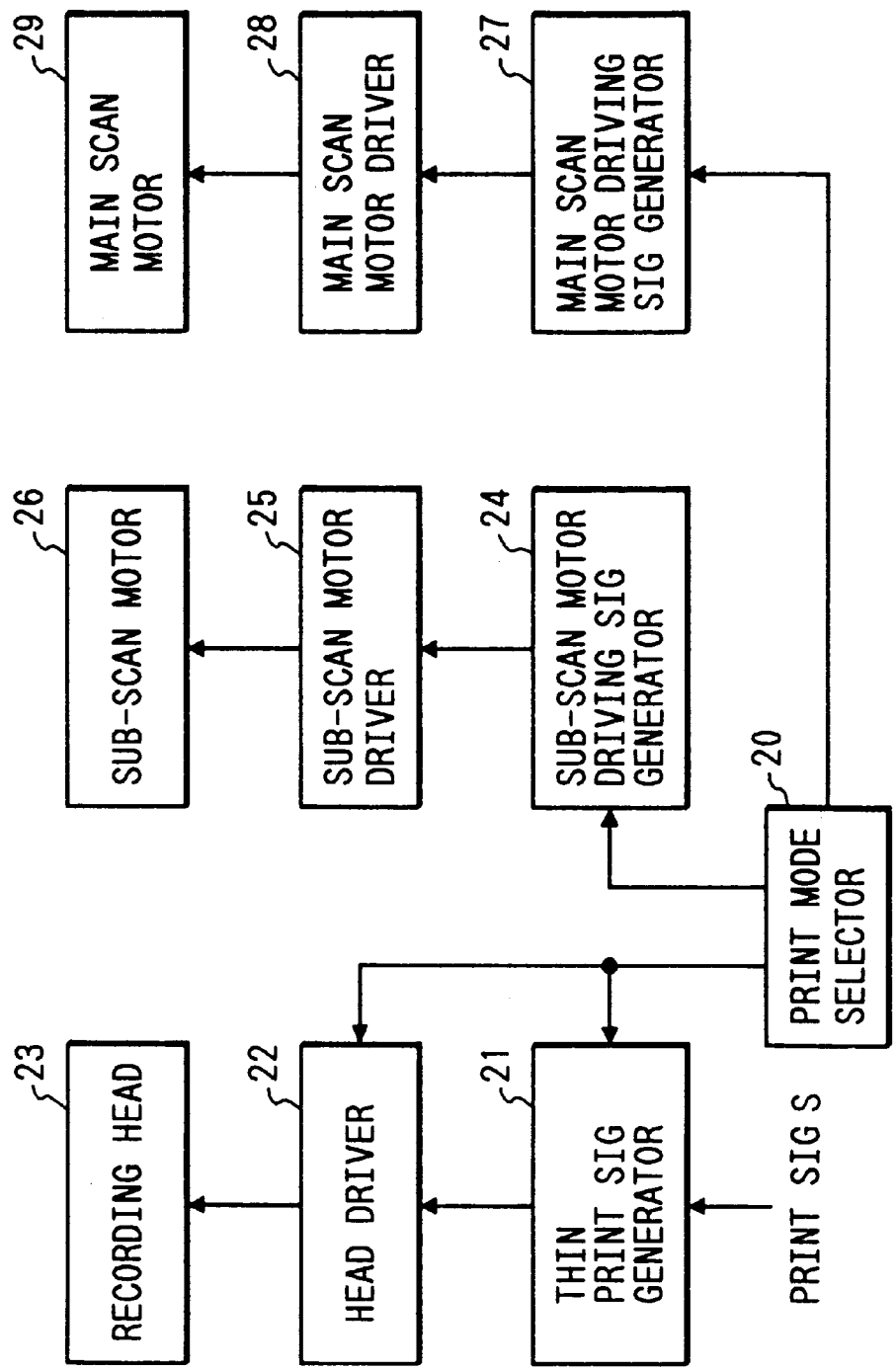
FIG. 2 is a block diagram showing the ink jet recording apparatus which can adopt the present invention.

FIG. 2 is a control block diagram of the ink jet recording apparatus which performs a thinning multi-pass print operation that can adopt the present invention. In FIG. 2, the recording head 23 has a plurality of ink ejection orifices,. and a plurality of electrothermal converting elements as ejection energy generation elements arranged in correspondence with the ejection orifices. In the recording head 23, an ejection signal according to recording data is supplied to the electrothermal converting elements, and bubbles formed by these elements cause a change in state of the ink, thereby ejecting ink droplets from the ejection orifices. The main scan motor 29 drives the drive belt 32. A print mode selector 20 switches a print mode automatically or by a manual switch operation by a user. A thin print signal generator 21 generates a thin print signal for performing the thinning multi-pass print operation from an input image signal (to be referred to as a print signal hereinafter) S when the print mode selector 20 selects a thinning multi-pass print mode. A head driver 22 drives the recording head 23 according to a signal from the thin print signal generator 21, and changes the driving condition of the recording head 23 according to the selected print mode, as will be described later. A main scan motor driving signal generator 27 generates a signal for driving the main scan motor 29. The generator 27 sequentially generates driving signals corresponding in number to passes when the thinning multi-pass print mode is selected by the print mode selector 20. A main scan motor driver 28 controls the driving operation of the main scan motor 29 according to a signal from the main scan motor driving signal generator 27. A sub-scan motor driving signal generator 24 generates a signal for driving the sub-scan motor 26. When the thinning multi-pass print mode is selected by the print mode selector 20, the generator 24 generates a driving signal for controlling the paper feed amount according to the selected mode. A sub-scan motor driver 25 controls the driving operation of the sub-scan motor 26 according to a signal from the sub-scan motor driving signal generator 24.

In this ink jet recording apparatus, the thinning multi-pass print operation is performed as follows. When the print mode selector 20 selects the thinning multi-pass print mode automatically or by a manual switch operation by a user, as shown in FIG. 3A, an input image signal is thinned out by the thin print signal generator 21 according to a predetermined thinning pattern (FIG. 3B), and is divided into thinned print signals S1 and S2, as shown in FIGS. 3C and 3D. Of these thinned print signals, the thin print signal S1 is supplied to the head driver 22 to drive the recording head 23, thereby ejecting ink droplets from the ejection orifices of the recording head 23. In synchronism with this head driving operation (a predetermined period of time before the head driving operation, in practice), the main scan motor driving signal generator 27 generates a main scan driving signal for the carriage, and the main scan motor 29 is driven according to a signal from the driver 28. The carriage 2 is moved along the scan rail 11, and performs the first-pass print operation. Upon completion of the scan operation, the main scan motor 29 is driven in the reverse direction, and the carriage 2 is returned to the start position. Furthermore, after passage of a predetermined period of time, the remaining thinned print signal S2 is supplied to the head driver 22 to drive the recording head 23. The second-pass print operation is performed in the same manner as in the first-pass print operation. Thereafter, the apparatus prepares for the print operation for the next line.

During these operations, since the sub-scan rollers are controlled so as not to move the recording medium, the thinning two-pass print operations can be realized. In the above description, the thinning two-pass print operations have been exemplified. The same applies to multi-pass print operations having three or more passes.

Temperature control of the recording head will be described below. The temperature control of the recording head is performed to maintain the recording head at a temperature suitable for a predetermined ink ejection quantity using a heating heater arranged in addition to the ejection heaters, and is executed in a recording mode and in a predetermined standby state.

In this embodiment, a temperature sensor is arranged on the recording head to perform so-called closed loop control. Alternatively, the temperature sensor may be arranged in an apparatus main body to control in order to maintain the temperature of the recording head, i.e., to perform so-called open loop control.

Figures 4, 5:
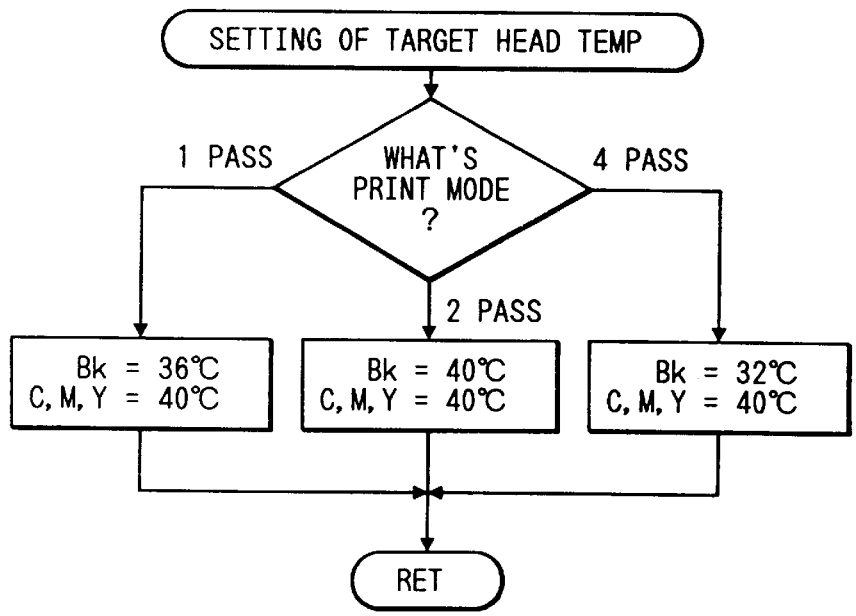
FIG. 4 is a table showing print control modes and target head temperatures according to the first embodiment of the present invention.
FIG. 5 is a flow chart showing a target temperature setting routine for a recording head.
Figure 6:
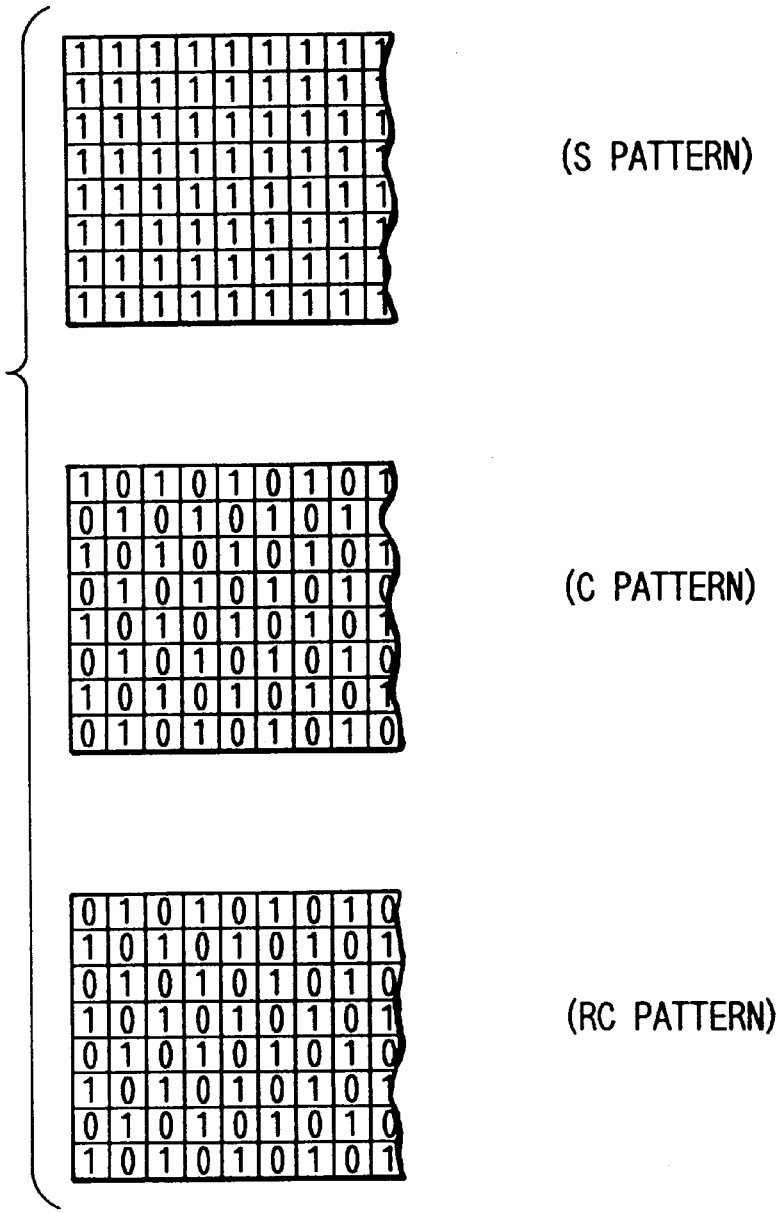
FIG. 6 is an explanatory view of recording patterns of the first embodiment.

In this embodiment, the target temperature is changed, as shown in FIG. 4, within a temperature range capable of stably ejecting an ink so as to change the ink ejection quantity according to the recording mode, as will be described later. FIG. 5 is a flow chart showing a simplified target head temperature setting routine according to the print mode. When a recording start command is input, the recording mode is discriminated on the basis of a panel operation of the recording apparatus main body or print mode setting data in a recording signal, and the target temperature of each recording head is set at an optimal temperature which is set in advance according to the discriminated recording mode. In FIG. 4, S, C, and RC described in the columns of first to fourth scans of each color in correspondence with the recording modes indicate the types of recording patterns, and FIG. 6 shows these recording patterns. In FIG. 6, an S pattern is a recording pattern used in a normal recording mode. With this pattern, all the recording data of a recording area are directly recorded without being thinned out. A C pattern is used for selecting and recording half of recording data of a recording area in a checker pattern, and an RC pattern is used for selecting and recording the remaining data of the C pattern in a reverse checker pattern.

Figure 7:
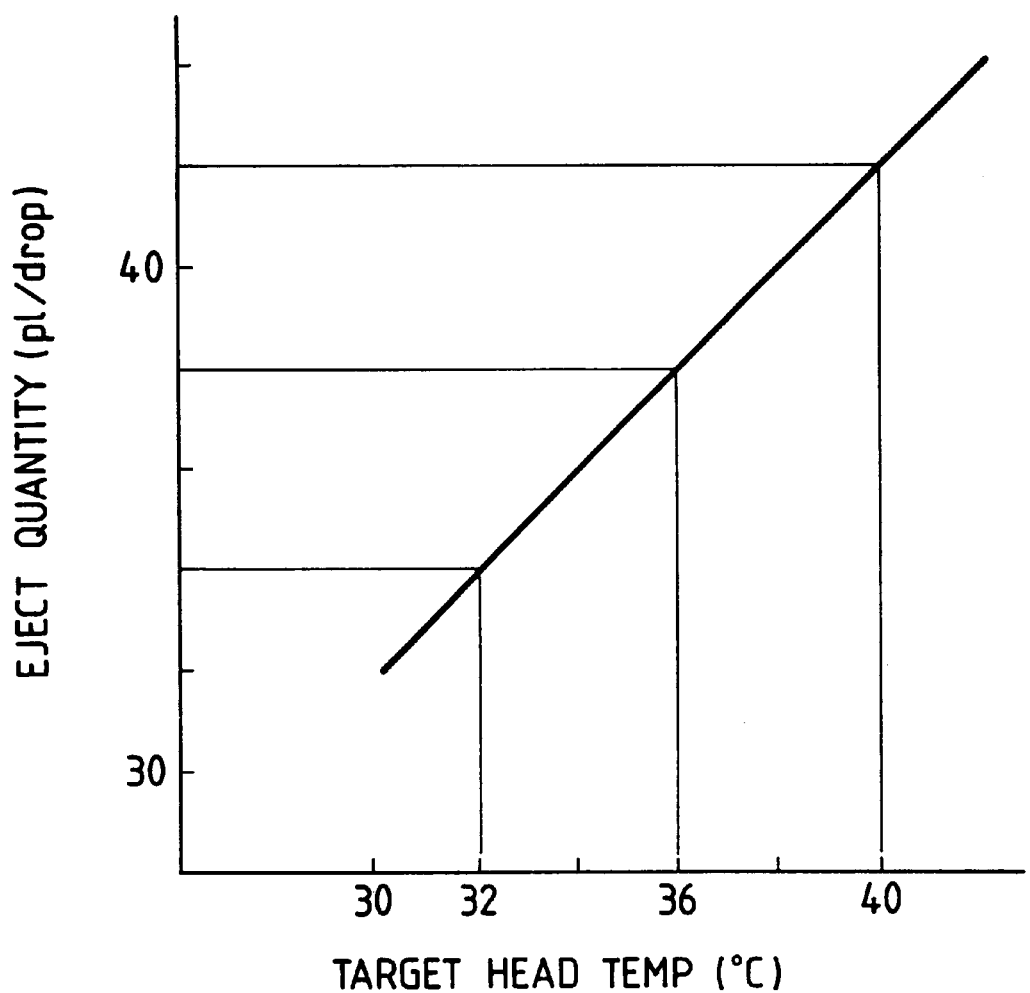
FIG. 7 is a graph showing the correlation between the target temperature and the ejection quantity of a recording head.

FIG. 7 shows an example of the ejection quantity obtained according to the target head temperature. An ejection quantity of about 34 pl at 32° C., and an ejection quantity of about 42 pl at 40° C. are obtained. In this temperature range, the ejection quantity is almost proportional to the target head temperature.

Figure 8:
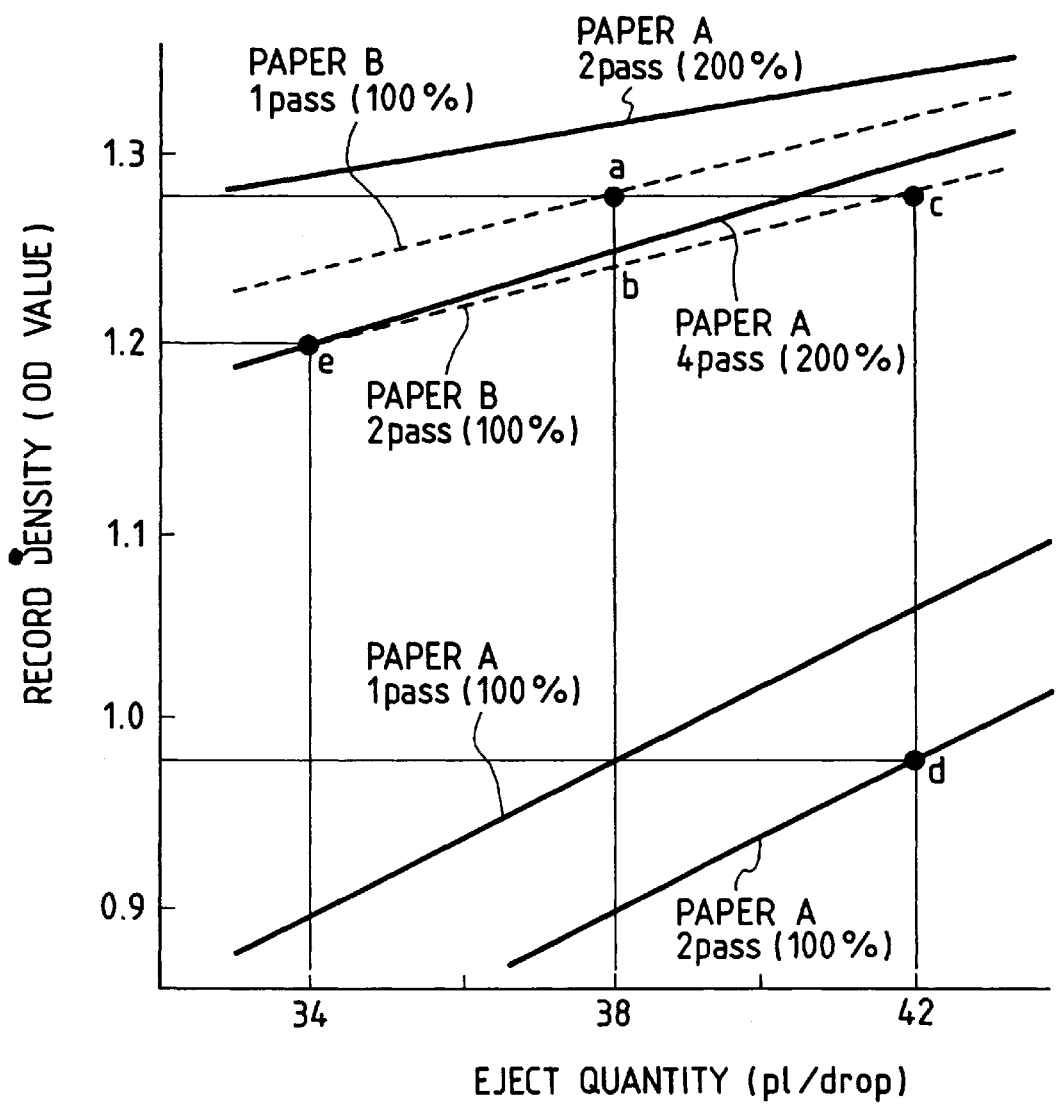
FIG. 8 is a graph showing the correlation between the ejection quantity and the record density according to recording modes and recording media.

FIG. 8 shows the relationship between the record density and the ejection quantity of the recording head in units of modes for paper B (coated paper) which has a relatively high ink absorption speed, and a high density although it relatively easily causes blur, and paper A (PPC paper) which has poor ink fixing characteristics and a low density. In this embodiment, a user can select a print mode on the operation panel of the recording apparatus according to the types of image and recording medium. This embodiment recommends a 1-pass mode for coated paper having good ink reception characteristics, and good recording characteristics such as color development characteristics, a 2-pass mode for the paper B such as coated paper inferior to the former coated paper, and a 4-pass mode for the paper A such as PPC paper, OHP paper, and the like.

A case will be exemplified below wherein a print operation is performed using the paper B. When an image, which has a high image ratio, and easily causes blur, is to be printed, the 2-pass mode is selected. At this time, if the target head temperature is set to be 36° C., as shown in FIG. 8, an ejection quantity of about 38 pl is obtained, and a density (solid density) is decreased by about 0.04 in the 2-pass mode (point b) as compared to the 1-pass mode (point a). Thus, in the 2-pass mode, an ink is ejected at 40° C. higher by 4° C. than the target head temperature (36° C.) in the 1-pass mode to obtain an ejection amount of about 42 pl larger than that (about 38 pl) in the 1-pass mode. As will be apparent from FIG. 8, a record density as high as that in the 1-pass mode can be obtained in the 2-pass mode when the ejection quantity is increased (point c). In other words, the total ink quantity on the recording medium in the 2-pass mode for identical recording data is set to be larger than that in the 1-pass mode, thereby preventing a decrease in density. That is, as for coated paper having inferior recording characteristics, when the 2-pass mode is selected as the print mode, and control is made to increase the ejection quantity of the recording head, an image free from blur and having a high density can be obtained.

A case will be exemplified below wherein a print operation is performed using the paper A. Since this paper easily causes blur, recording data must be divided, and divided data must be sequentially recorded. In this case, since the paper A has a print density considerably lower than that of the paper B, and the like, 200% data must be printed by overlapping the same recording data. In this case, it is difficult to increase the eject quantities of C, M, and Y color inks, which easily cause ink blur at color boundaries. In this embodiment, only a Bk ink is repetitively printed. In order to print 200% data, the 200% data must be divided into 50% data, and 50% data must be recorded four times (4-pass mode). At the same time, the target head temperature of a Bk head is decreased to 32° C. to slightly decrease the eject quantity (about 34 pl). For this reason, the densities of C, M, and Y, and their color mixing portions are lower than those on the paper B (point d), and the Bk density is relatively low (point e). However, as for blur, almost a satisfactory image can be obtained. Thus, an image better than achievabel using a conventional method can be obtained using paper having inferior ink jet recording characteristics.

Second Embodiment

In this embodiment, a method of modulating a first pulse in a W-pulse driving mode previously proposed by the present applicant in U.S. patent application Ser. No. 08/104, 261 is used as an ejection quantity control means for a recording head.

Figure 9:
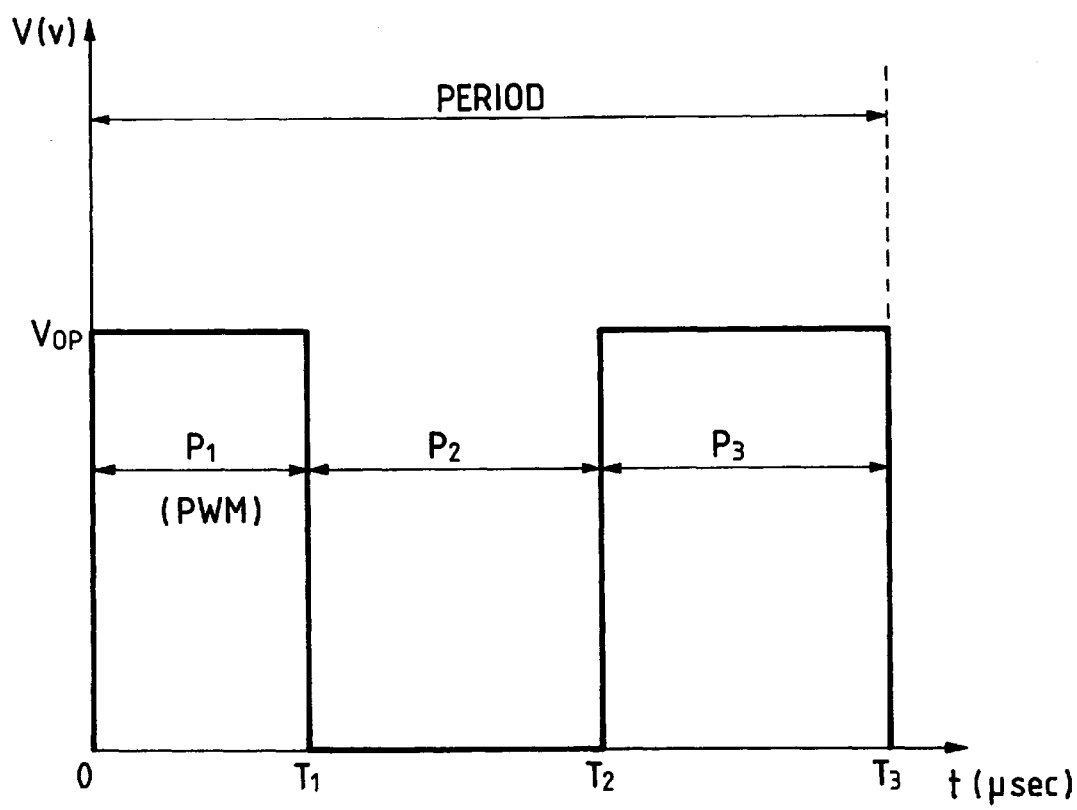
FIG. 9 is a chart showing an ejection quantity setting state under the PWM control according to the second embodiment of the present invention.

This method is particularly effective for the following case. When the recording frequency for driving a head is increased to increase the recording speed, recording characteristics such as ejection characteristics may change due to heat generated by the head itself during recording in an ink jet recording system using heat energy of the recording head, as described above. When PWM control shown in FIG. 9 is performed, the ejection quantity is stabilized according to a change in head temperature. More specifically, when the pulse width of a preheat pulse P1 is modulated according to a change in head temperature, the ejection quantity can be stabilized by a main heat pulse P3. Since such PWM control has a shorter control response time than head temperature control used in the first embodiment, control can be made within one scan period as well as in units of scan periods. With this driving scan operation, a stable ejection quantity can be obtained regardless of the frequency or the print duty.

In FIG. 9, Vop indicates electric energy necessary for heat energy on an H.B (heater board), and is determined by the area, resistance, and film structure of the H.B, and the nozzle structure of the head. P1 indicates the preheat pulse width, P2 indicates the interval time, and P3 indicates the main heat pulse width. T1, T2, and T3 indicate the times from the leading edge of the preheat pulse, which times respectively determine P1, P2, and P3. In a divisional pulse width modulation driving method, the pulses are applied in the order of P1, P2, and P3. The preheat pulse P1 is used for mainly controlling the ink temperature in nozzles. The pulse width of the pulse Pl is controlled by temperature detection utilizing a temperature sensor of the head. At this time, a bubble pre-generation phenomenon caused by application of too much heat energy onto the H.B is prevented. The interval time P2 serves to form a predetermined time interval so as to prevent interference between the preheat pulse P1 and the main heat pulse P3, and to make uniform the temperature distribution of an ink in the nozzles. The main heat pulse P3 causes a bubble generation phenomenon on the H.B to eject ink droplets from nozzle orifices. These pulse widths are determined by the area, resistance, and film structure of the H.B, the nozzle structure of the head, and the ink's physical properties.

Figure 11:
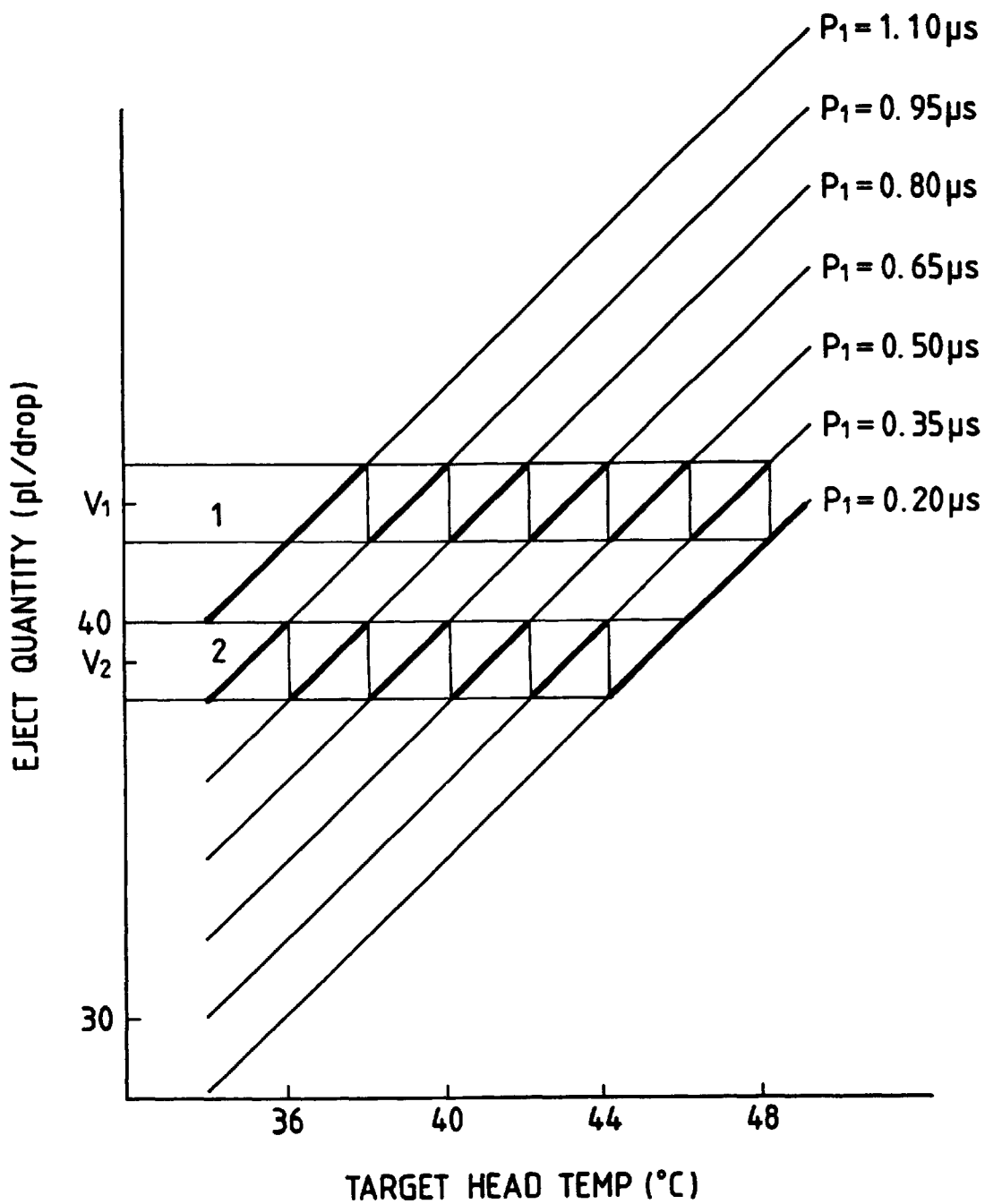
FIG. 11 is a graph showing ejection quantity control based on table conversion.

FIG. 10 shows two types of pulse width tables ① and ② corresponding to head temperatures. As shown in FIG. 11, when the table content is changed between ① and ②, the target ejection quantity can be changed between two types of quantities, i.e., $V_1$ and $V_2$. In ejection quantity control of this embodiment, a standard ejection quantity is assured by the above-mentioned head temperature control (36° C.), and is stabilized by PWM control.

Figure 12:
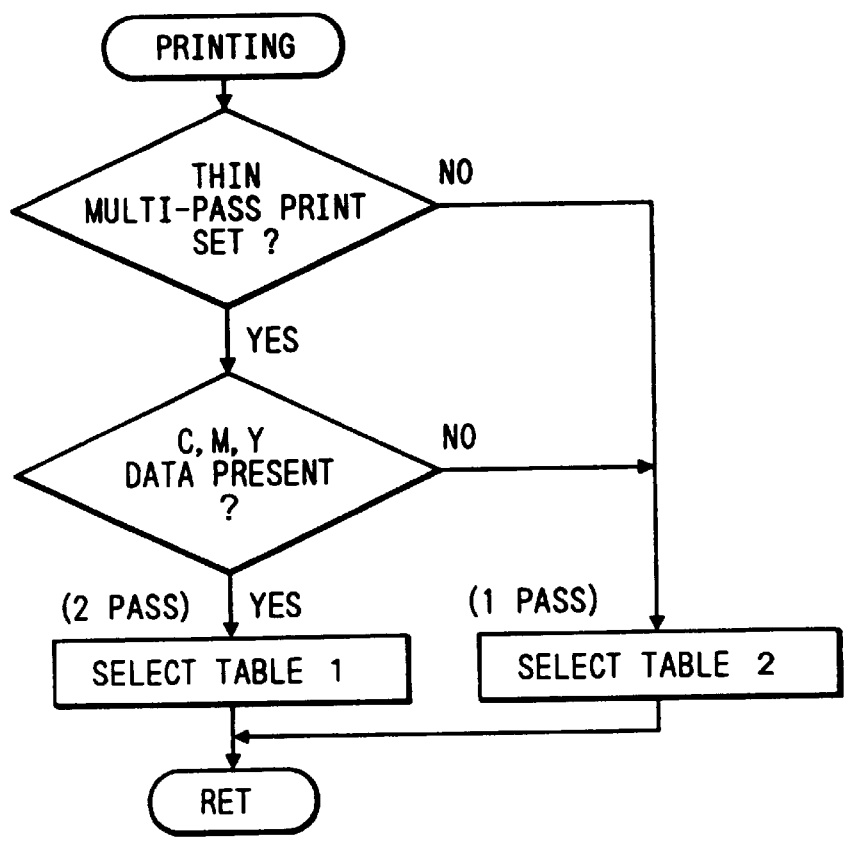
FIG. 12 is a flow chart showing a head driving control routine of the second embodiment.

In this embodiment, according to the flow chart shown in FIG. 12, even when a thin multi-pass print mode is set, if there are no color data other than Bk, a 1-pass mode is selected since a problem of blur does not easily occur; only when there are C, M, and Y data is a thin 2-pass print mode selected. The Bk density changes in lines with and without C, M, and Y data, as shown in FIG. 5. In this embodiment, as shown in FIG. 12, the PWM table is changed to change the ejection quantity according to the presence/absence of C, M, and Y data, thereby stabilizing the density. More specifically, even when the 2-pass mode is designated since paper having poor ink absorption characteristics is used, the recording density can be increased for an image, which does not actually pose a problem of blur.

Third Embodiment

This embodiment exemplifies a recording mode which can eliminate density nonuniformity in a recording head, which tends to occur in a multi-nozzle recording head, and which can perform high-quality recording unlike in the above embodiments wherein the multi-pass recording mode is used mainly for preventing blur, and increasing the density. A print method unique to this embodiment is shown in FIGS. 13A to 13C, and FIG. 14. For the sake of simplicity, a monochrome print operation using a single recording head will be exemplified below.

Figure 13A:
FIGS. 13A to 13C are explanatory views showing recording processes in a recording method according to the third embodiment of the present invention.
Figure 13B:
Figure 13C:

In FIGS. 13A to 13C, an 8-nozzle recording head is divided into two groups each including four nozzles, and a print operation is performed by feeding paper by an amount corresponding to four nozzles (half a line). In this case, recording data may be divided into patterns described in the first embodiment. In this embodiment, however, patterns obtained by alternately thinning out columns are used to facilitate a print operation by increasing the carriage scan speed (twice in a ½ thinning mode) so as to attain a maximum driving frequency of the head in a divisional recording mode in correspondence with a matrix driving method for simultaneously driving adjacent nozzle groups. Of course, the carriage speed can be increased using the patterns of the first embodiment as long as a matrix driving method for driving every other nozzle is employed.

Figure 14:
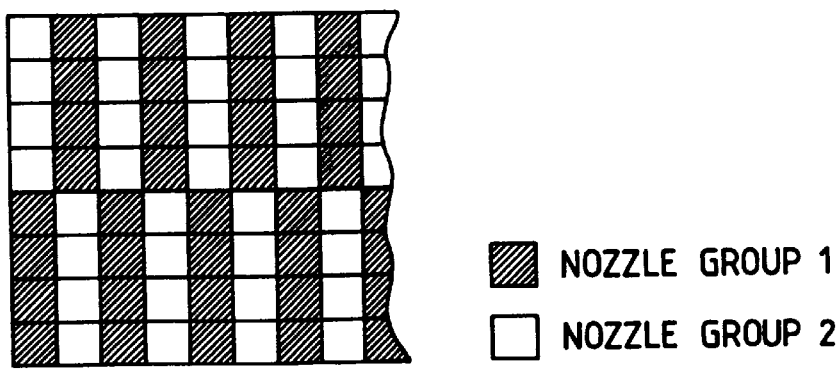
FIG. 14 is an explanatory view showing a state upon completion of recording by the recording method of the third embodiment.

In the print method of this embodiment, the upper half recording area of the first line is thin-printed by the second nozzle group. After paper is fed by half a line, the remaining portion of the upper half recording area is printed by the first nozzle group, and a lower half recording area is thin-printed. Then, after the paper is fed by half a line, the lower half area of the first line, and an upper half area of the second line are thin-printed. This operation is repeated, and the lower half recording area of the last line is recorded by the first nozzle group, thus completing recording of all the data. When the print operation is performed by this print method, recording operations using different nozzles in the carriage scan direction are alternately performed, as shown in FIG. 14. Thus, density nonuniformity caused by the nozzles can be eliminated, and a good image can be obtained.

However, according to the experiments of the present inventors, a decrease in density is often observed even by the print method of this embodiment as compared to a simple 1-pass recording mode. For this reason, in this embodiment, an ejection quantity control means is arranged to increase the ejection quantity when this recording mode is selected. As the ejection quantity control means, the same temperature control as in the first embodiment may be employed, or the ejection quantity stabilization means in the second embodiment may be used.

As described above, the ink jet recording apparatus comprises print method control means for switching a print mode between a thinned multi-pass print mode for controlling the number of times of scan operations of the recording head for a single recording area, and for sequentially recording divided recording data, and a 1-pass print mode for recording all the recording data in a single head scan operation, and an eject quantity control means for controlling the ejection quantity of an ink. The ejection quantity control means is controlled so that a total ink quantity per unit recording area in the thinned multi-pass print mode is larger than that in the one-pass print mode. Thus, image recording suitable for various recording media can be attained.

Further aspects of the present application will be described hereinafter.

Figure 19:
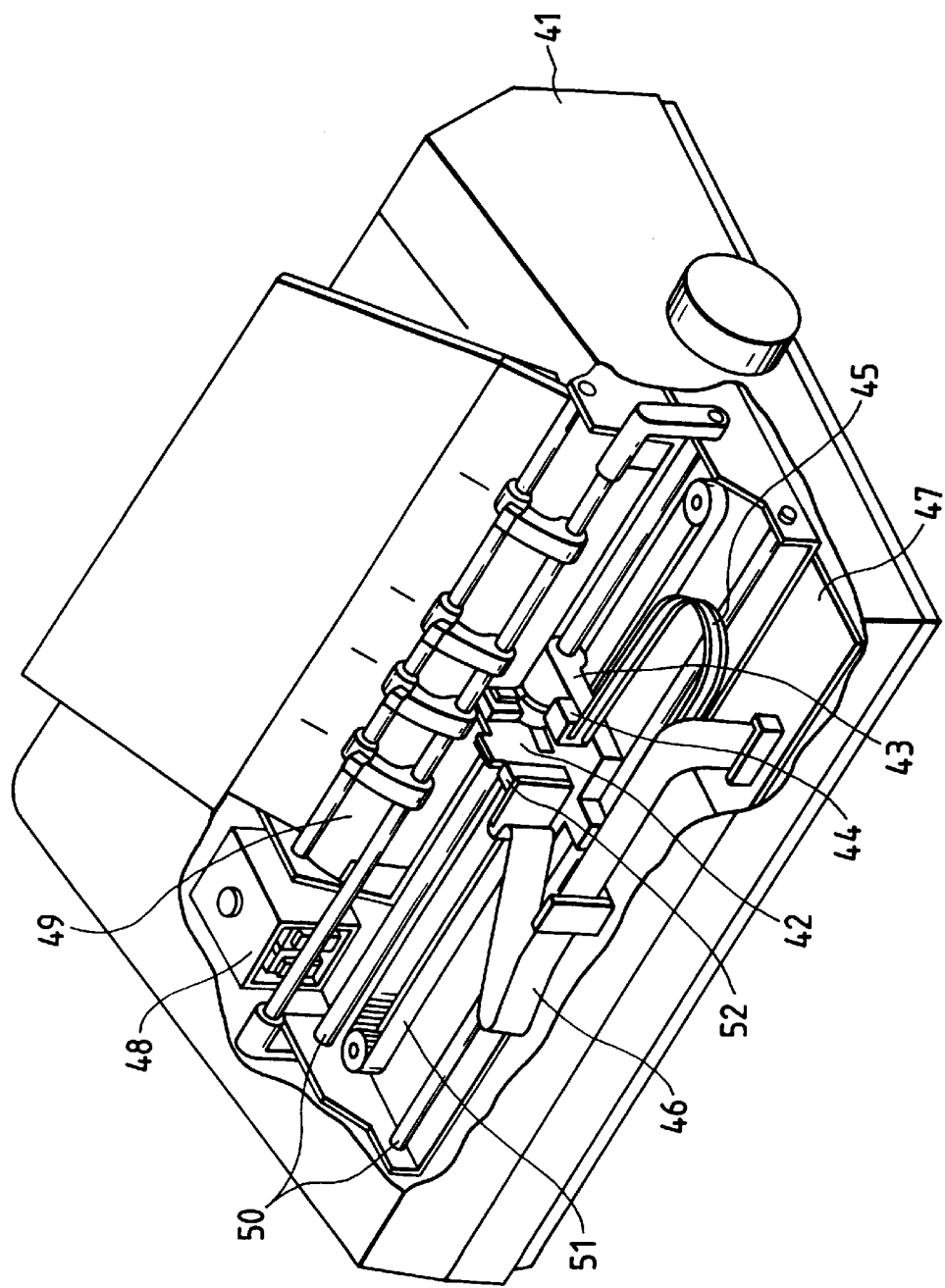
FIG. 19 is a partially cutaway perspective view of an ink jet recording apparatus which can adopt the present invention.

FIG. 19 is a perspective view showing an arrangement of an ink jet recording apparatus which can adopt the second invention of the present application.

An ink jet recording head 42 is mounted on a carriage 43, which is scanned along a slide shaft 50 in the right-and-left direction by a carriage driving motor (CR motor; not shown) and a carriage driving belt 51. An electrical signal from a main board 47 is supplied to the head 42 through a flexible printed circuit board (FPC) 46. An ink is supplied from an ink cartridge (not shown) in a main body of an ink jet recording apparatus 41 through an ink supply suction tube 45, and via a sub ink tank 44 on the carriage 43. Since the ink jet recording head 42 sometimes causes an ejection error due to mixing of bubbles, attachment of an ink to its orifice surface, or the like, a suction recovery device is arranged at the home position of the carriage 43 of the ink jet recording apparatus 41. A recording medium is fed upward by a paper feed motor (LF motor; not shown) along a platen 49, and data is recorded on the recording medium by scanning the recording head 42 in the right-and-left direction.

Figure 20:
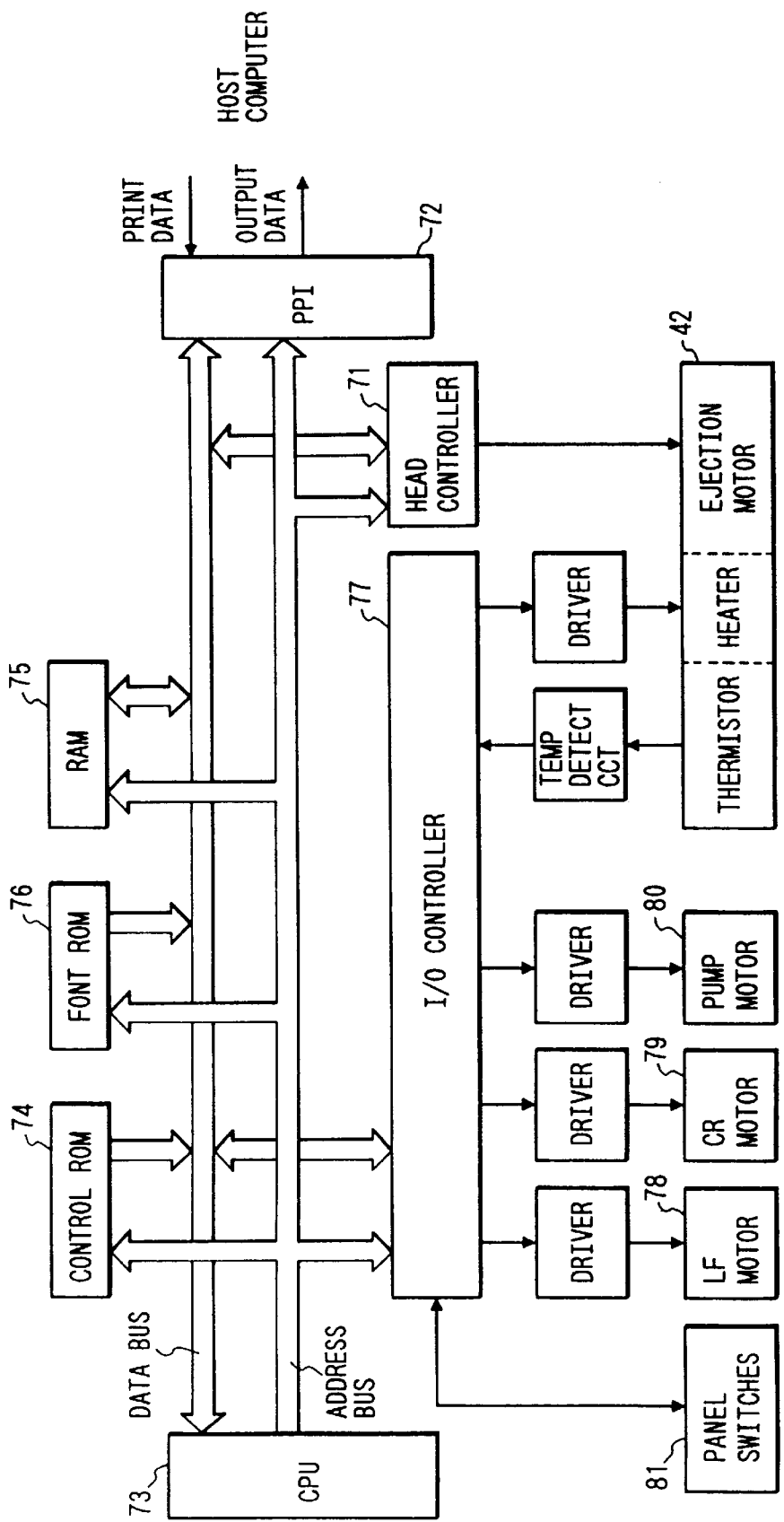
FIG. 20 is a block diagram of a control unit of the ink jet recording apparatus which can adopt the present invention.

FIG. 20 is a block diagram showing an arrangement of a control unit (main board 47) of the ink jet recording apparatus 41. This control unit receives print data from, e.g., a host computer, stores print data for one line, and causes a head controller 71 of the recording head 42 to control the recording head 42, thereby performing a print operation.

A PPI (programmable peripheral interface) 72 receives parallel print data supplied from a host computer of the recording apparatus according to this aspect of the invention, and then supplies the print data to a CPU 73. The CPU 73 executes various processing sequences of the recording apparatus according to the content of a control ROM 74. A RAM 75 is a line buffer memory for storing print data received by the PPI 72 for several lines, a font ROM 76 is a memory for storing fonts of print output characters, and the control ROM 74 is a memory for storing the processing sequences to be executed by the CPU 73. These memories are connected to each other through an address bus and a data bus.

An I/O controller 77 is an IC for exclusively performing, based on instructions from the CPU 73, control of a paper feed motor (LF motor) 78, a carriage driving motor (CR motor) 79, and a suction recovery device driving motor (pump motor) 80, data I/O control to panel switches 81, control of a heater in the recording head 42, input control of temperature information from a temperature detection means (thermistor) in the recording head 42, and the like. The head controller 71 is a special-purpose IC for latching print data and print output time data, and supplying a print output to the recording head 42 according to an instruction from the CPU 73. The recording head 42 ejects an ink according to the print data and the print output time data from the head controller 71, thus recording data onto a recording medium.

Figure 21:
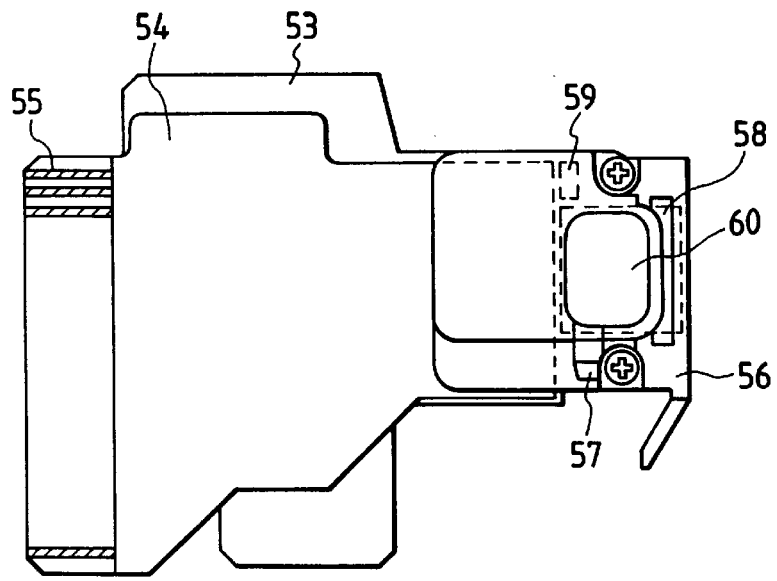
FIG. 21 is a schematic view of an ink jet recording head which can adopt the present invention.

FIG. 21 is a view showing an arrangement of the ink jet recording head, in particular, an ink jet head utilizing heat as ejection energy. A printed circuit board (PCB) 54, a thermistor 59, and an ejection element 58 consisting of nozzles for ejecting an ink, heaters, and a liquid chamber are joined on a base plate 53. Print data from the FPC 46 is transmitted to the ejection element 58 through the PCB 54 when a head connector 52 (FIG. 19) on the FPC 46 is engaged with a connector portion 55 of the PCB 54 on the recording head 52.

Figure 22:
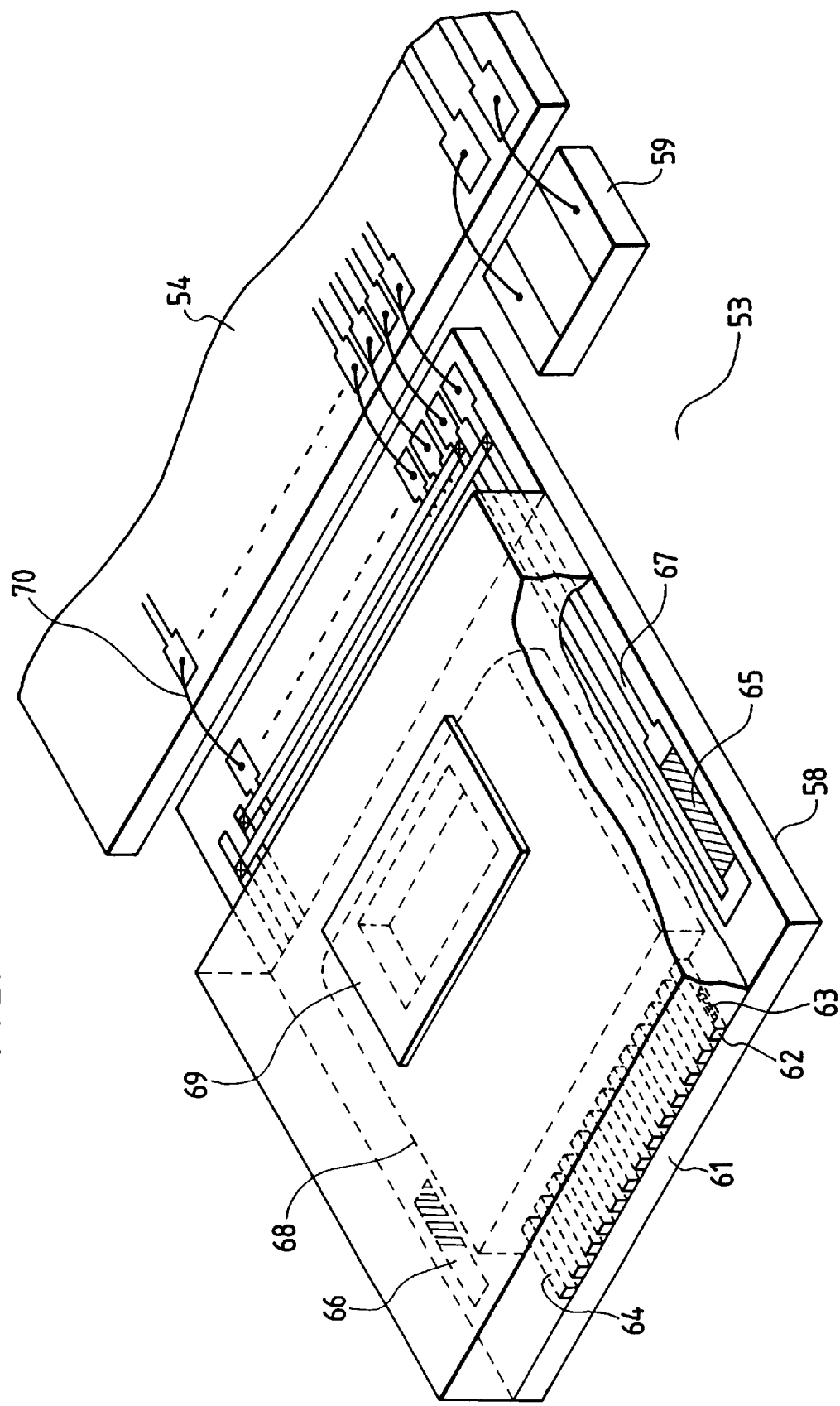
FIG. 22 is a sectional view showing principal parts of the ink jet recording head which can adopt the present invention.

An ink is supplied to the ejection element 58 through a holder 56 which is integrated with an ink supply tube 57 and an ink storage 60, and protects the principal parts of the recording head. The details of the ejection element 58 (FIG. 22) are the same as those described above, and a detailed description thereof will be omitted.

Figure 23:
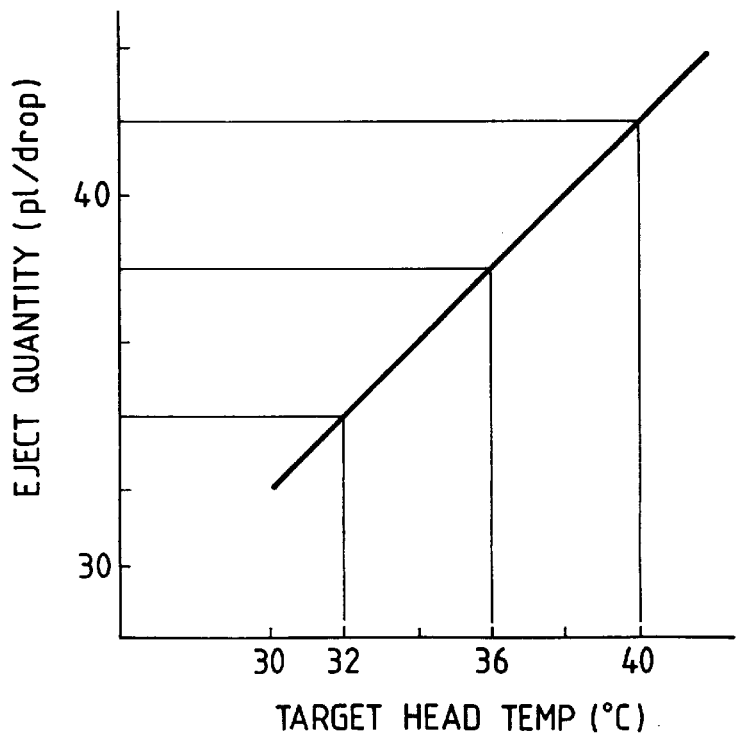
FIG. 23 is a graph showing the correlation between the target head temperature and the ejection quantity of the recording head.

Temperature control of the recording head is performed by maintaining the recording head 42 at a temperature suitable for a predetermined ink ejection quantity using heaters 65 and 66 arranged in addition to ejection heaters 63, and is executed during recording, and in a predetermined standby state. FIG. 23 shows an ejection quantity obtained according to the target head temperature. An ejection quantity of about 34 pl/drop is obtained at 32° C., and an ejection quantity of abut 42 pl/drop is obtained at 40° C. In this temperature range, the ejection quantity is almost proportional to the target head temperature.

Fourth Embodiment

Figure 15:
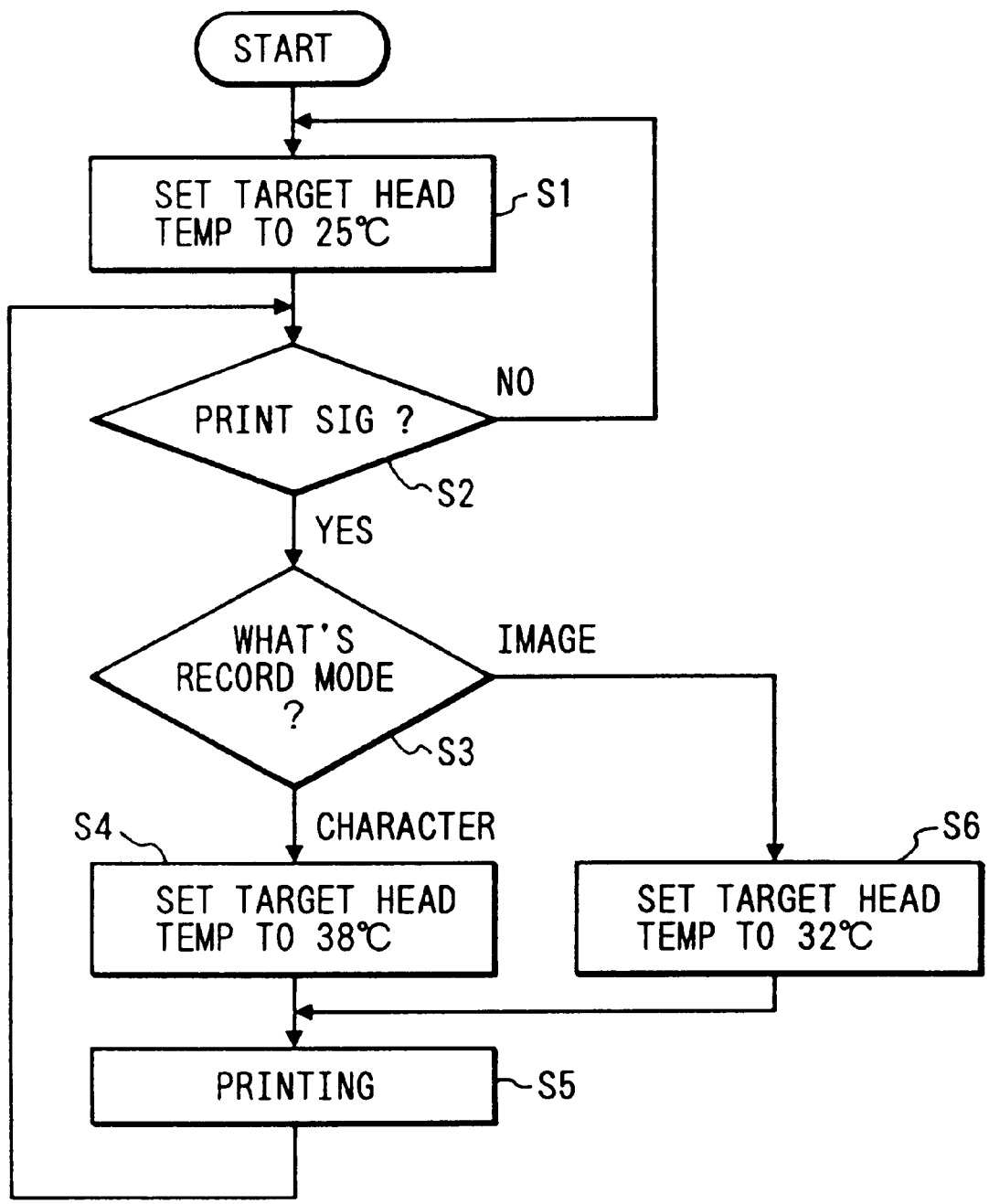
FIG. 15 is a flow chart showing a head temperature control routine according to the fourth embodiment of the present invention.

FIG. 15 shows the fourth embodiment, and is a flow chart associated with temperature control of the recording head during recording. When the power switch of the recording apparatus is turned on, the CPU 73 sets the target head temperature at 25° C. through the I/O controller 77 in step S1, and then waits for a print signal. When the print signal is input through the PPI 72 in step S2, the CPU 73 discriminates in step S3 based on a control signal in the print signal whether the recording mode is a character (text) or image mode. If the character mode is discriminated, the CPU 73 sets the head target temperature at 38° C. in step S4, and executes the printing operation in step S5. On the other hand, if the input print signal indicates the image mode, the printing operation is performed after the target head temperature is set at 32° C. in step S6.

In this manner, when a character having a low print density is to be printed, the ink eject quantity is increased to obtain a print density equivalent to that obtained when an image having a high print density is printed.

Fifth Embodiment

Figure 16A:
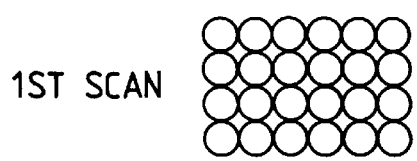
FIGS. 16A to 16C are explanatory views of an image recording method.
Figure 16B:
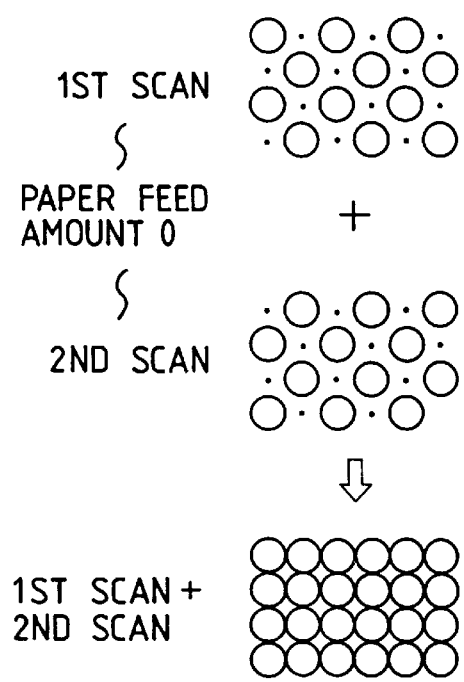
Figure 16C:
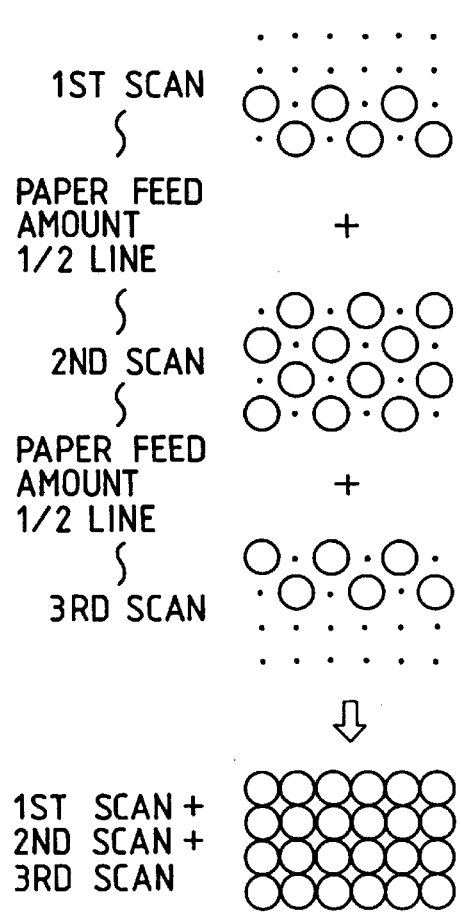

In this embodiment, an image is printed selectively in a 1-pass print mode or a multi-pass print mode. FIGS. 16A to 16C are explanatory views of the 1-pass print mode and the multi-pass print mode.

FIG. 16A shows the one-pass image print mode. In this mode, a solid print operation is performed in a single carriage scan operation.

FIG. 16B shows a 2-pass image print mode. In this mode, image data are printed at interpolating positions to overlap each other at a ½ print density in two carriage scan operations. This mode is a particularly effective recording method for preventing blur at a color boundary in a color image.

In this case, an image obtained as a total of the first and second scan operations is the same as that obtained in the 1-pass print mode shown in FIG. 16A. However, since the print density per scan is lowered, the temperature rise of the nozzle section of the recording head is decreased, and the volume of an ink to be ejected is decreased. Furthermore, since the print density is low, blur of an ink on a recording medium in the lateral direction is eliminated as compared to that in the 1-pass print mode. As a result, the print density of the image obtained by the two scan operations is lower than that obtained in the 1-pass print mode.

Similarly, FIG. 16C shows a multi-pass print method that can attain a high-definition print operation. In this method, the paper feed amount between adjacent scan operations is set to be a ½ line, and data of a ½ duty is repeated while feeding paper by a ½ line. As a result, this print method can visually eliminate shifts of landing points caused by individual nozzles. In this case, the print density is lower than that in the 1-pass print mode.

Figure 17:
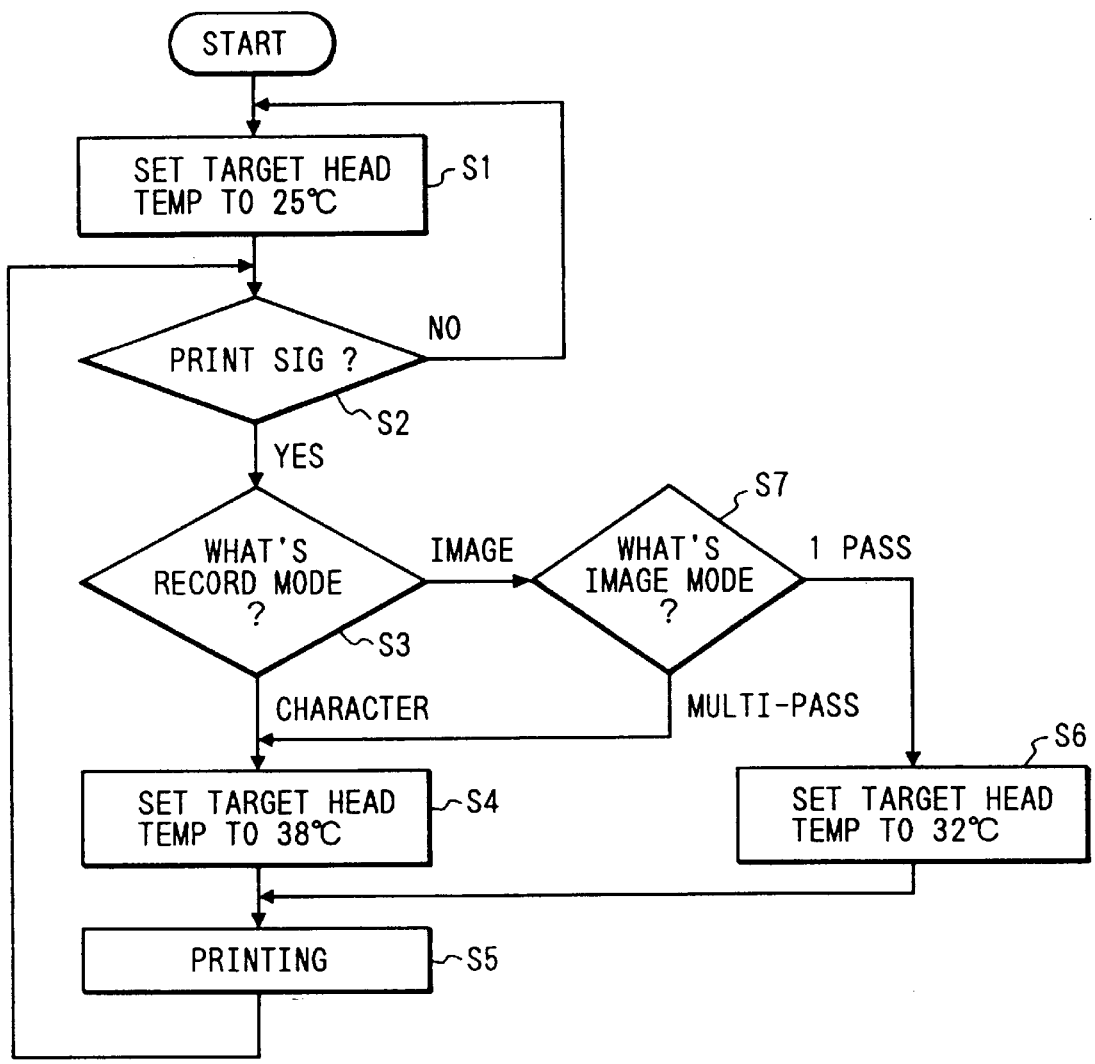
FIG. 17 is a flow chart showing a head temperature control routine according to the fifth embodiment of the present invention.

FIG. 17 is a flow chart showing the fifth embodiment. In this flow chart, step S7 is added to the flow chart shown in FIG. 15. In this embodiment, when the recording mode is an image mode, it is checked in step S7 if the image mode is the 1-pass print mode 15 or the multi-pass print mode. If the 1-pass print mode is selected, the target head temperature is set at 32° C. in step S6; if the multi-pass print mode is selected, the target head temperature is set at 38° C., equal to that in a character mode, in step S4.

Thus, the print density difference between the one-pass and multi-pass print modes can be eliminated in the image recording mode.

Sixth Embodiment

Figure 18:
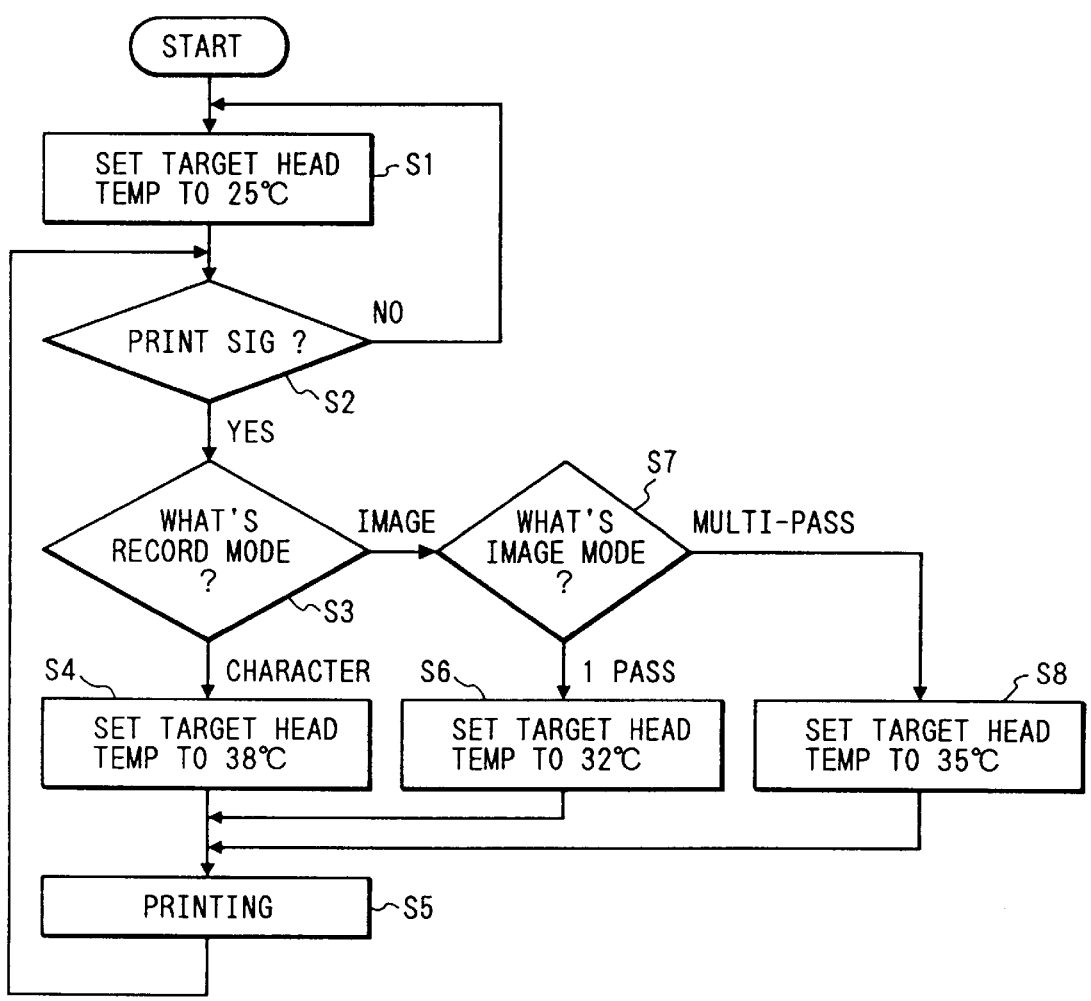
FIG. 18 is a flow chart showing a head temperature control routine according to the sixth embodiment of the present invention.

FIG. 18 is a flow chart showing the sixth embodiment. In this embodiment, the target head temperature can be set more precisely. More specifically, in this flow chart, step S8 is added to the flow chart shown in FIG. 17. When a character (text) mode is selected, the target head temperature is set at 38° C. in step S4; when a 1-pass image mode is selected, the target head temperature is set at 32° C. in step S6; and when a multi-pass image mode is selected, the target head temperature is set at 35° C. in step S8.

Thus, the print density difference among the respective print modes can be further eliminated.

In the above embodiments, control is made to keep uniform the print density among the respective print modes. However, the present invention can also be applied to a case wherein a print density in a specific mode must be set to be particularly higher or lower than that in other modes.

In order to control the ink ejection quantity, the target head temperature is controlled in this embodiment. However, the present invention is not limited to this.

As described above, according to the present invention, the recording mode of an input print signal is discriminated, and a target temperature of the recording head is set in correspondence with the discriminated mode, thereby eliminating a print density difference among various recording modes.

Furthermore, the present invention is also effective for a case wherein a print density in a specific mode must be set to be particularly higher or lower than that in other modes.

The next aspect of the present application will be described below.

According to this aspect of the present application, an ink jet recording apparatus performs recording while controlling the temperatures of a plurality of recording heads for performing recording by ejecting inks by utilizing heat energy so as not to fall outside predetermined temperature ranges, which are set in units of recording heads. Therefore, in particular, in a color recording mode, the use temperature range of a black ink recording head can be set to be different from those of other monochrome ink recording heads. For this reason, even when a print operation is performed not only on coated paper but also on a recording medium such as regular paper or OHP paper, which has poor fixing characteristics, and cannot provide a sufficient OD (average optical density) value as compared to the coated paper, the print density of black characters or lines can be increased. Furthermore, the ink implantation quantity on a color recording portion obtained by mixing colors is suppressed, and improvement of fixing characteristics and prevention of boundary blur can be attained. As a result, an image with high print quality can be recorded.

When print density characteristics are measured in units of recording heads, optimal use temperature ranges can be set in units of recording heads.

An embodiment of this aspect of the present application will be described in detail below with reference to the accompanying drawings.

Seventh Embodiment

Figure 26:
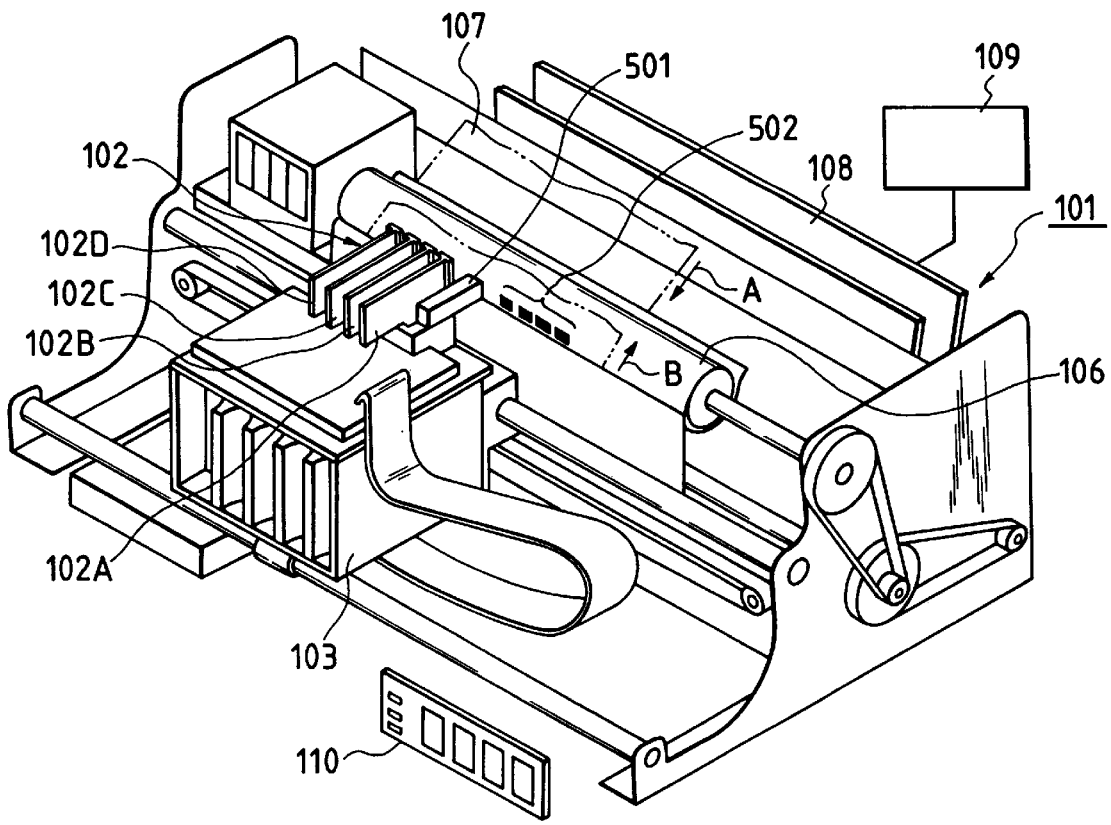
FIG. 26 is a perspective view showing an arrangement of a recording section of the ink jet recording apparatus.

FIG. 26 is a perspective view showing an arrangement of a recording section of an ink jet recording apparatus 101 of this invention. In FIG. 26, recording heads 102 are arranged on a carriage 103, and are moved upon horizontal movement of the carriage 103.

Figure 30:
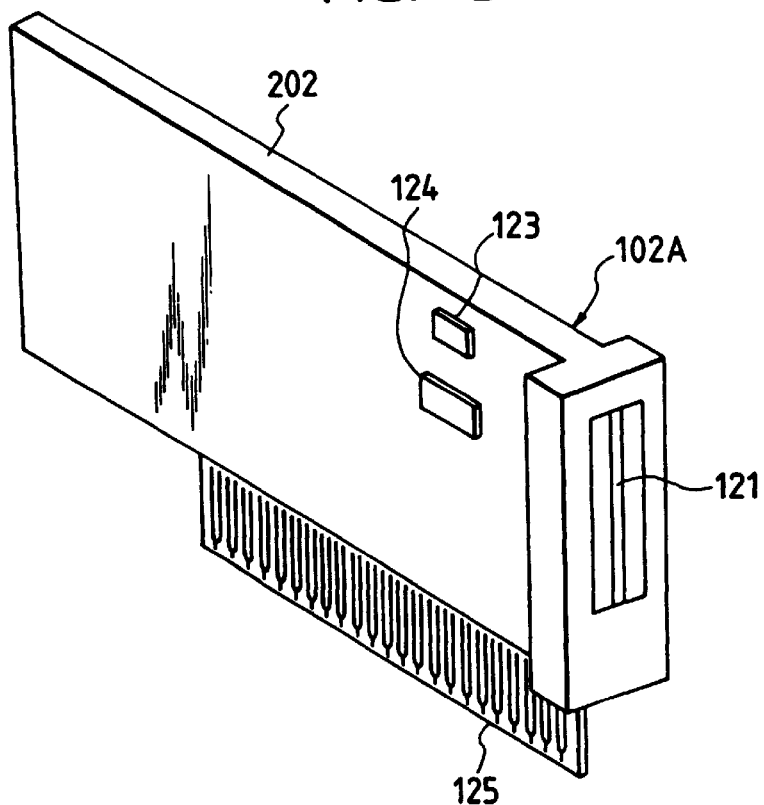
FIG. 30 is a schematic perspective view showing an arrangement of a recording head 102A.

A plurality of recording heads 102A, 102B, 102C, and 102D are those for respectively ejecting four color inks, i.e., Y (yellow), M (magenta), C (cyan), and Bk (black). Although not shown in FIG. 26, each recording head is integrally provided with a warm-up heater 207 (FIG. 27) and a thermistor 123 (FIG. 30).

A control unit 108 for controlling ejection of these four color recording heads is connected to a host computer 109 for transferring recording signals, data, and the like. The recording apparatus 101 is provided with a panel 110 at which a print mode is set or the state of the recording apparatus is displayed or changed by a user.

In FIG. 26, as a recording medium (recording paper) 107, regular paper, OHP paper, or coated paper is used. The recording paper 107 is supported on a platen 106, and is moved in directions of arrows A and B in FIG. 26. In this state, an image recording operation is performed on the recording paper 107 by the recording heads 102.

The ejection principle of the recording head used in the ink jet recording apparatus of this embodiment as a recording means of the present invention will be explained below.

A recording head unit applied to the ink jet recording apparatus normally comprises fine ink ejection orifices, ink channels, energy application sections arranged in portions of the ink channels, and energy generation means for generating ink droplet forming energy to be applied to inks in the application sections. The recording head unit is replaceable. As the energy generation means for generating such energy, electrothermal converting elements are employed to heat an ink, thereby ejecting the ink.

In the recording head unit used in an ink jet recording method for ejecting an ink by heat energy, since the ink ejection orifices for ejecting recording ink droplets to form flying ink droplets can be arrayed at a high density, a high-resolution recording operation can be performed. The recording head unit using the electrothermal converting elements as the energy generation means can be rendered compact as a whole, and can sufficiently utilize the merits of IC techniques and micropatterning techniques, which have shown remarkable technical advances and improved reliability in the recent semiconductor field. Therefore, an elongated, two-dimensional structure or a multi-nozzle, high-density packaging structure can be easily realized. For this reason, an ink jet recording head unit suitable for mass-production, and having low manufacturing cost can be provided.

In the ink jet recording head unit using the electrothermal converting elements as the energy generation means, and manufactured through the semiconductor manufacturing processes, the ink channels corresponding to the ink ejection orifices are arranged. The electrothermal converting elements are arranged as means for applying heat energy to inks filled in the ink channels in units of ink channels, and ejecting inks from the corresponding ink ejection orifices to form flying ink droplets. An ink is supplied, to the ink channels, from a common ink chamber communicating with the ink channels.

As for a manufacturing method of an ink ejection section, the present applicant proposed the following method (see Japanese Laid-Open Patent Application No. 62-253457). In this method, a solid state layer for forming at least ink channels, an active energy ray setting material layer utilized in formation of at least walls of the ink channels, and a second substrate are sequentially stacked on a first substrate. Thereafter, a mask is stacked on the second substrate, and active energy rays are radiated from above the mask, thereby setting at least the walls of the ink channels of the active energy ray setting material layer as constituting portions. Furthermore, the solid state layer and the non-setting portion of the active energy ray setting material layer are removed from a portion between the two substrates, thereby forming at least the ink channels.

Figure 27:
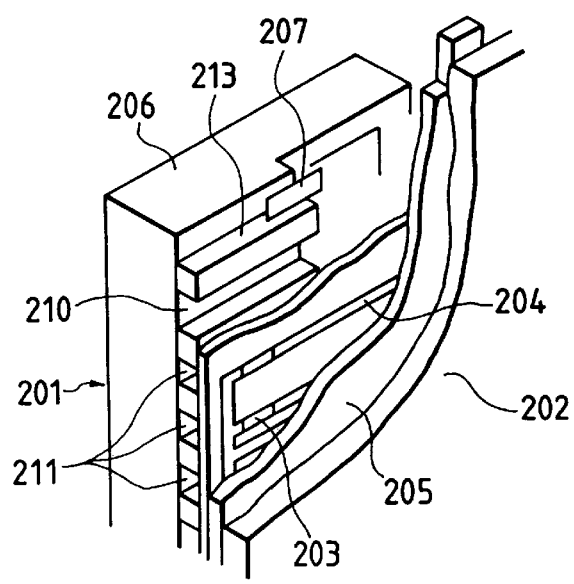
FIG. 27 is a schematic view showing an arrangement of an ink jet recording head unit.

FIG. 27 shows a schematic arrangement of a nozzle-side portion of the above-mentioned ink jet recording head unit. A recording head unit 201 is constituted by a substrate 202 as the first substrate, a set active energy ray setting material layer 213 having electrothermal energy converting elements 203, electrodes 204, and ink channels 210 formed on a silicon base 205 as the second substrate, and a top plate 206 via semiconductor manufacturing processes such as etching, evaporation, sputtering, and the like.

An ink is supplied into each ink channel 210 by capillary action, and is stably held since a meniscus is formed at a nozzle 211 at the ink ejection orifice at the distal end portion of the ink channel. When the corresponding electrothermal converting element 203 is energized, the ink on the surface of the electrothermal converting element is heated, and a bubble formation phenomenon caused by film boiling occurs. Then, upon growth of the bubble, an ink droplet is ejected from the nozzle 211. With the above-mentioned arrangement, the multi-nozzle ink jet recording head unit can be formed with a high-density liquid channel arrangement, i.e., at an ejection orifice density as high as 400 dots/inch. The recording head unit 201 also includes a warm-up heater 207 for increasing the temperature of the recording head unit 201 to a predetermined temperature.

Figure 28:
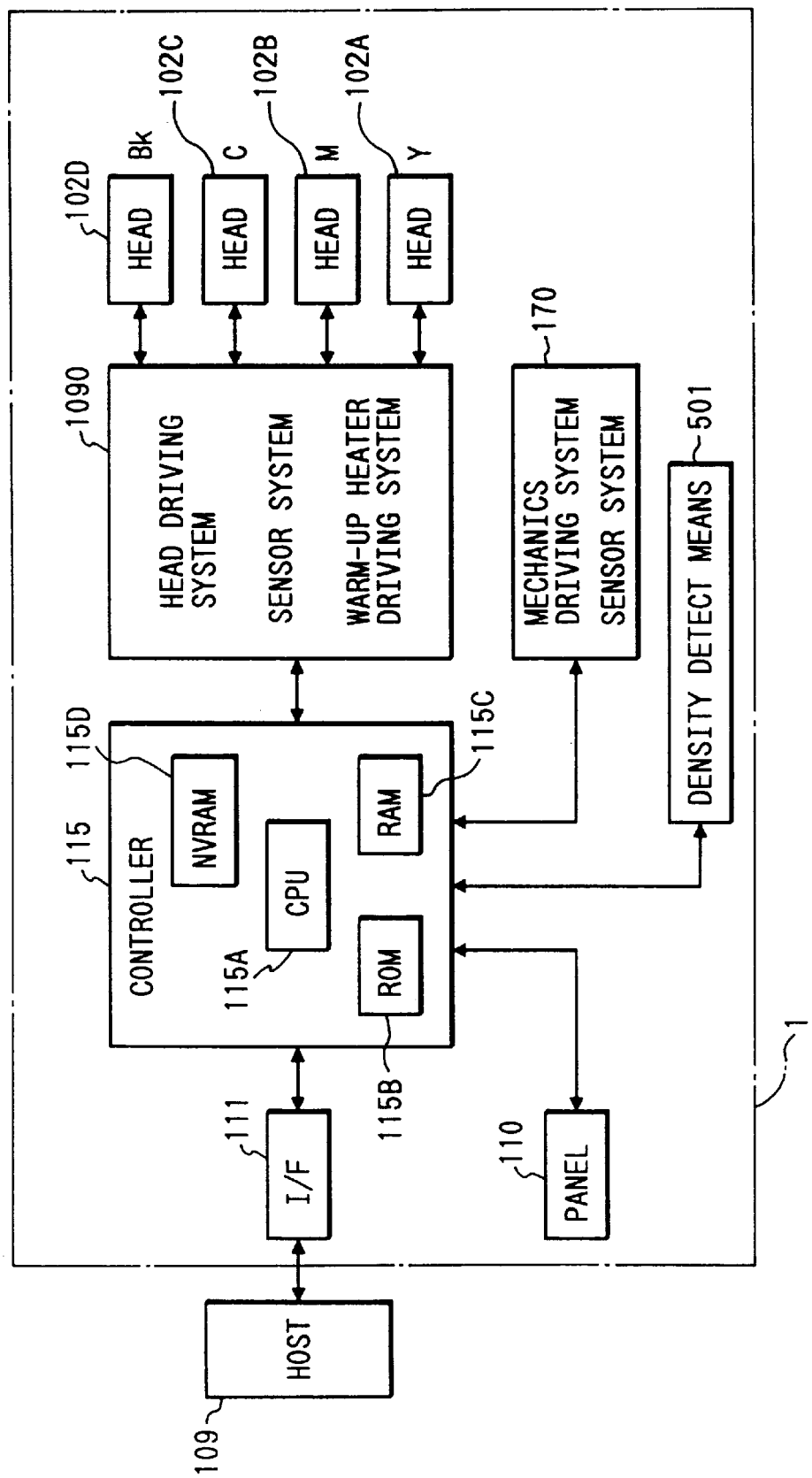
FIG. 28 is a block diagram showing an arrangement of a control system of the ink jet recording apparatus.

FIG. 28 is a block diagram showing an arrangement of a control system of the ink jet recording apparatus 101 based on the above arrangement. In FIG. 28, the recording apparatus 101 is connected to the host computer 109 through an interface 111.

A controller 115 constitutes a control means and a temperature range setting means, which control the temperatures of the recording heads so as not to fall outside predetermined temperature ranges set for respective recording heads on the basis of temperature information detected by temperature detection means of the recording heads. A CPU 115A controls the respective units, and a ROM 115B stores a program corresponding to the control sequence of the CPU 115A. A RAM 115C is used as a work area upon execution of the control sequence. The controller 115 is connected to a head driving system/sensor system/warm-up heater 1driving system 190, a mechanics driving system/sensor system 170, and a panel 110.

The controller 115 is connected to the four color recording heads 102A, 102B, 102C, and 102D through the head driving system/sensor system/warm-up heater driving system 190.

Figure 29:
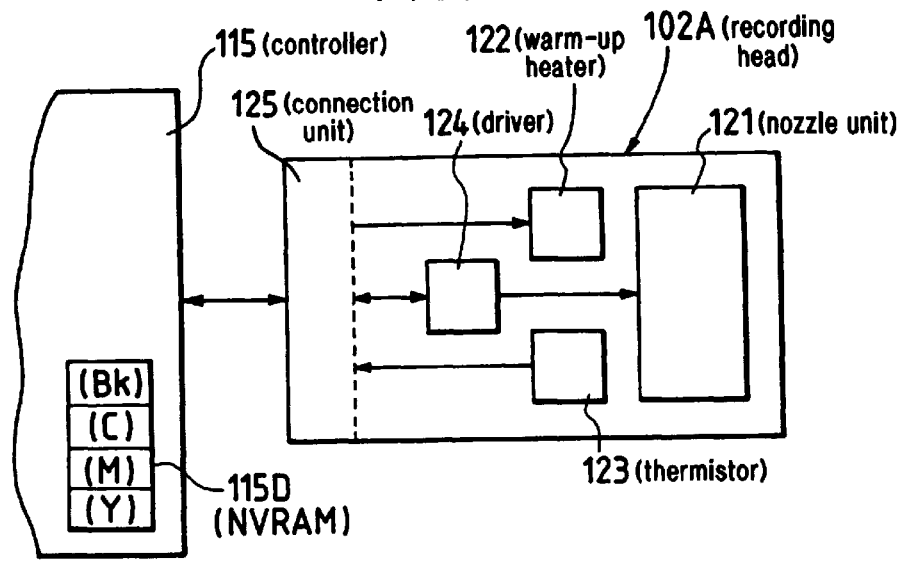
FIG. 29 is a block diagram showing an arrangement obtained by integrating a driver, a temperature control heater, and a temperature measurement sensor to a recording head itself.

FIG. 29 is a block diagram of the recording head 102A mounted on the ink jet recording apparatus shown in FIG. 26. In the arrangement shown in FIG. 29, a driver, a temperature control warm-up heater, and a temperature measurement thermistor are integrated to the recording head 102 itself. In FIG. 29, a nozzle unit 121 is heated by a warm-up heater 122 to a predetermined temperature range. A thermistor 123 serves as a temperature detection means of the recording head 102A. A driver 124 applies an ink ejection driving force to the nozzle unit 121.

The driver 124 exchanges signals with the controller 115 through a connection unit 125. The connection unit 125 can be integrated with the recording head in a printed circuit board form.

FIG. 30 is a schematic perspective view showing an arrangement of the recording head 102A shown in FIGS. 26 and 29. FIG. 30 illustrates the nozzle unit 121, the substrate 202, and the electrical connection unit 125 with the controller 115. In addition, FIG. 30 illustrates the thermistor 123 as the temperature detection means of the recording head 102A and the driver 124 in an exposed state.

Figure 31:
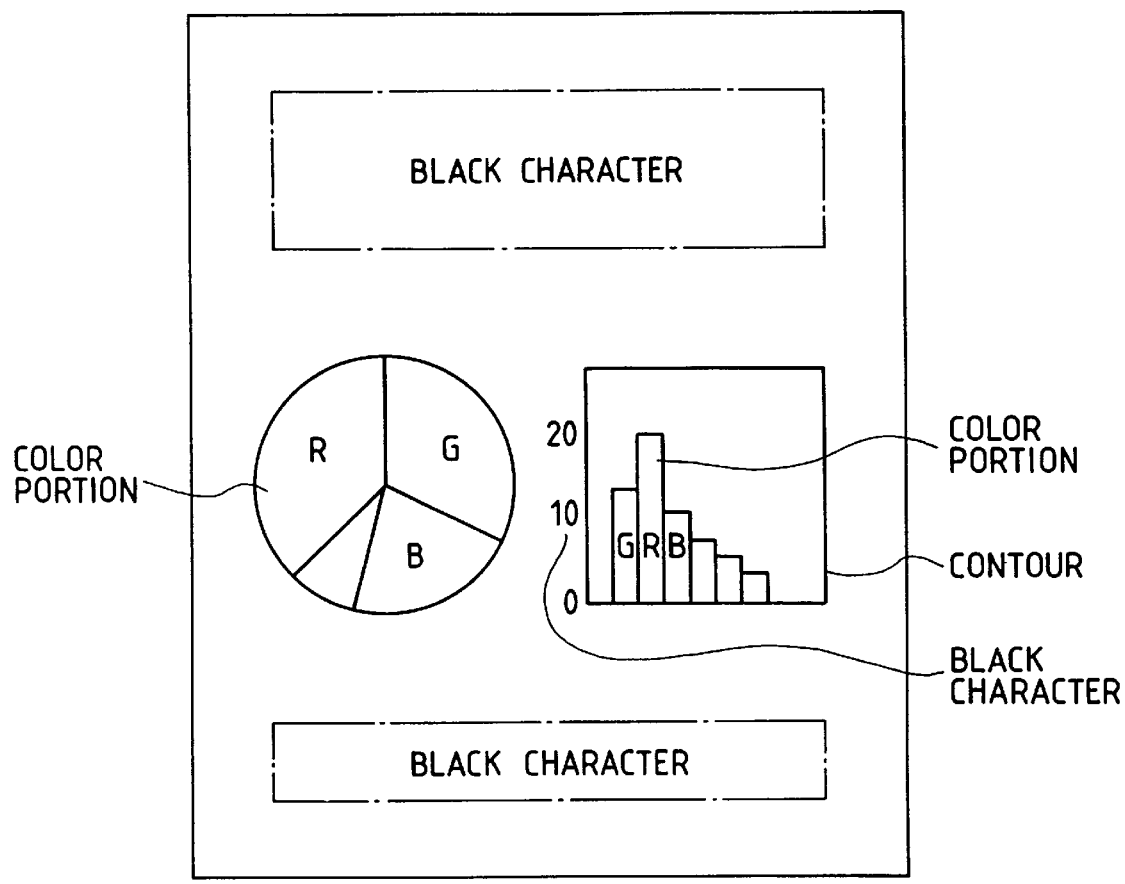
FIG. 31 shows a print sample.

FIG. 31 shows a print sample. When such a print sample image is recorded on a recording medium such as regular paper or OHP paper having poor ink absorbency so that black characters and line portions such as contour lines can be clearly recognized, the black density must be increased. On the other hand, in a color portion, blur at boundary portions among R, G, and B must be eliminated, so that colors can be clearly discriminated from each other.

Therefore, in color boundary portions, a large quantity of ink is not implanted so as to prevent contamination caused by mixing of different colors.

However, in the ink jet recording technique for performing recording by ejecting an ink by utilizing heat energy, the ink ejection quantity is easily influenced by the temperature of the recording head. For this reason, when a recording operation is performed on a recording medium such as regular paper or OHP paper having poor ink absorbency, if temperature control of the recording head is performed in the same manner as in a case wherein a recording operation is performed on coated paper, contamination is easily caused by blur at boundaries of R, G, and B as color mixing portions due to a large ink eject quantity.

In order to prevent this, according to the present invention, as shown in FIG. 28 or 29, an NVRAM (nonvolatile random-access memory) 115D, which is programmable from the operation panel or the host computer, is provided to the controller 115, and stores use temperature ranges set in units of color recording heads.

For example, a Bk (black) recording head is set to have a use temperature range between 36° C. and 60° C., and Y (yellow), M (magenta), and C (cyan) recording heads are set to have use temperature ranges between 30° C. and 50° C.

The upper limit of the use temperature range of each of the C, M, and Y monochrome recording heads is set to be slightly lower than that of the Bk recording head, so that the ink ejection quantity does not become too large, and blur at R, G, and B color mixing portions does not easily occur. When a print operation is continuously performed line after line, the temperatures of the recording heads are increased. When the sensor unit (thermistor) 123 detects that the temperature of one of the C, M, and Y monochrome recording heads or the Bk recording head exceeds the upper limit of the corresponding use temperature range, the controller 115 causes a delay in carriage operation on the basis of this temperature information, so that the ejection quantity from the recording head does not become too large. More specifically, the controller 115 controls to stop the carriage operation for a predetermined period of time, or to decrease the carriage movement speed to decrease the ejection frequency until the temperature of the recording head is decreased below the upper limit of the use temperature range.

The reason why the upper limit value of the use temperature range of the Bk recording head is set to be higher than that of the C, M, and Y monochrome recording heads is to increase the black print density.

Similarly, the lower limit of the use temperature range of the Bk recording head is set to be higher than that of the C, M, and Y monochrome recording heads, thereby increasing the black print density. When the sensor unit 123 detects that the temperature of one of the C, M, and Y monochrome recording heads or the Bk recording head is below the lower limit of the corresponding use temperature range, the corresponding heater unit 122 is energized based on this temperature information to heat the corresponding recording head so as to obtain a predetermined print density, and this control is repeated until the temperature of the recording head is increased above the lower limit value of the set use temperature range.

Figure 24:
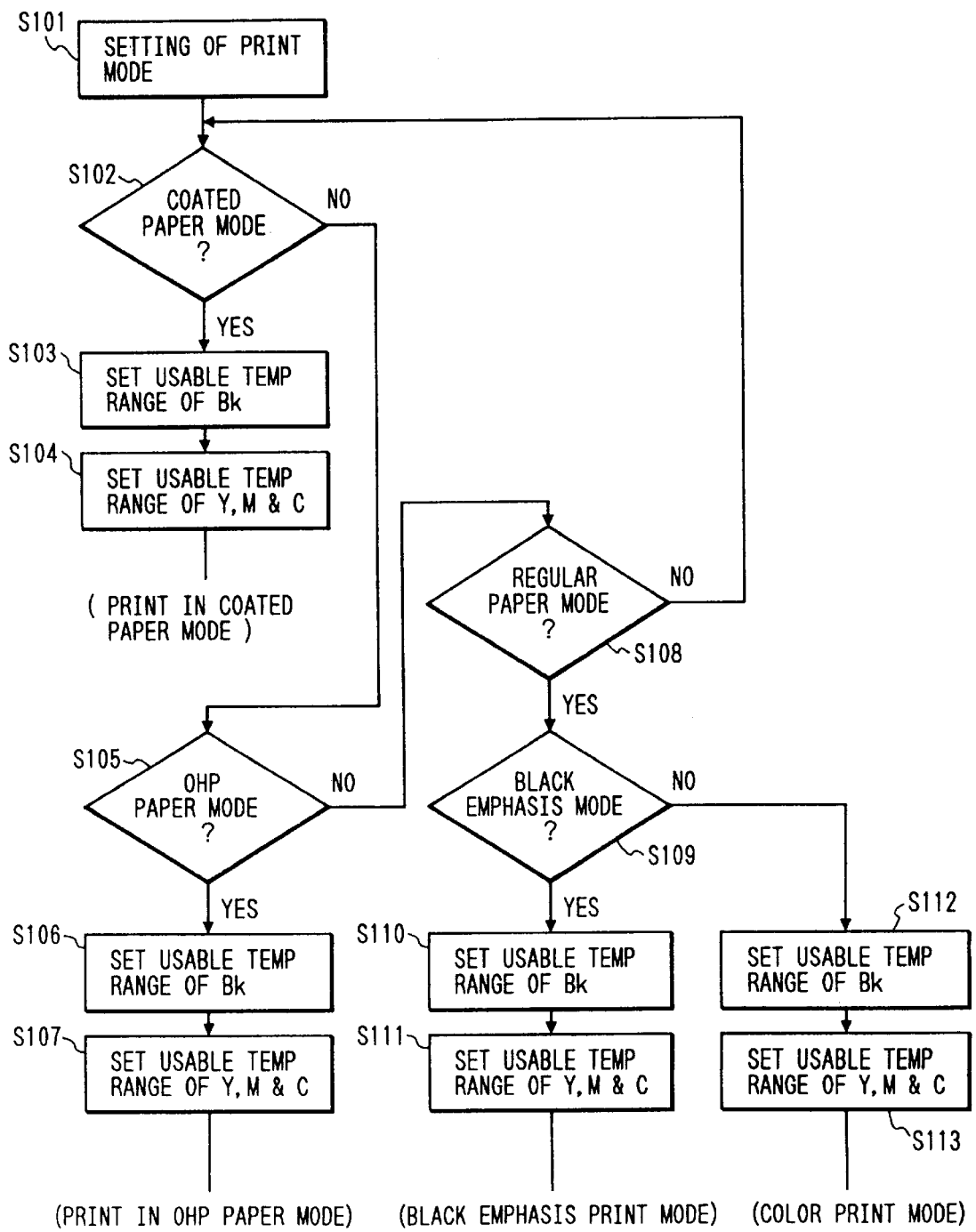
FIG. 24 is a flow chart showing a processing sequence for setting a use temperature range of the recording head.

FIG. 24 is a flow chart showing a use temperature range setting sequence of the recording heads according to the present invention. In step S101, a print mode is set. In this case, the print mode is set based on a key input of a print mode setting key provided to the panel 110 or a command from the host computer 109. Thereafter, the controller 115 checks if the print mode is a coated paper mode (step S102). If it is determined that the coated paper mode is selected (YES in step S102), the CPU 115A reads out a use temperature range $T_1$ (e.g., 32° C.$\leq T_1 \leq$55° C.) of the Bk recording head from the ROM 115B, and writes it in the NVRAM 115D (step S103). The CPU 115A also reads out a use temperature range $T_{11}$ (e.g., 32° C.$\leq T_{11} \leq$55° C.) of each of the Y, M, and C recording heads from the ROM 115B, and writes it in the NVRAM 115D (step S104). In this manner, after the CPU 115A writes the use temperature ranges in the NVRAM 115D, temperature control is performed, and the print operation is performed in the coated paper mode. On the other hand, if the selected mode is not the coated paper mode (NO in step S102), the controller 115 checks if the selected mode is an OHP paper mode (step S105).

If the OHP paper mode is selected (YES in step S105), the CPU 115A reads out a use temperature range $T_2$ (e.g., 34° C.$\leq T_2 \leq$55° C.) of the Bk recording head from the ROM 115B, and writes it in the NVRAM 115D (step S106). The CPU 115A also reads out a use temperature range $T_{12}$ (e.g., 30° C.$\leq T_{12} \leq$50° C.) of each of the Y, M, and C recording heads from the ROM 115B, and writes it in the NVRAM 115D (step S107). In this manner, after the CPU 115A writes the use temperature ranges in the NVRAM 115D, temperature control is performed, and the print operation is performed in the OHP paper mode.

If the selected mode is not the OHP paper mode (NO in step S105), the controller 115 checks if the selected mode is a regular paper mode (step S108). If the regular paper mode is selected (YES in step S108), the controller 115 then checks if a black emphasis mode is selected (step S109). In the black emphasis mode, the density of a black portion is further increased to emphasize black lines, black contour portions, and the like to obtain a color image having high contrast. If it is determined that the black emphasis mode is selected (YES in step S109), the CPU 115A reads out a use temperature range $T_3$ (e.g., 36° C.$\leq T_3 \leq$60° C.) of the Bk recording head from the ROM 115B, and writes it in the NVRAM 115D (step S110). The CPU 115A also reads out a use temperature range $T_{13}$ (e.g., 30° C.$\leq T_{13} \leq$50° C.) of each of the Y, M, and C recording heads from the ROM 115B, and writes it in the NVRAM 115D (step S111). In this manner, after the CPU 115A writes the use temperature ranges in the NVRAM 115D, temperature control is performed, and the print operation is performed in the regular paper black emphasis print mode.

On the other hand, if it is determined that the selected mode is not the black emphasis mode (NO in step S109), the CPU 115A reads out a use temperature range $T_4$ (e.g., 32° C.$\leq T_4 \leq$50° C.) of the Bk recording head from the ROM 115B, and writes it in the NVRAM 115D (step S112). The CPU 115A also reads out a use temperature range $T_{14}$ (e.g., 30° C.$\leq T_{14} \leq$50° C.) of each of the Y, M, and C recording heads from the ROM 115B, and writes it in the NVRAM 115D (step S113). In this manner, after the CPU 115A writes the use temperature ranges in the NVRAM 115D, temperature control is performed, and the print operation is performed in the regular paper color print mode. On the other hand, if NO in step S108, the flow returns to step S102, and the control waits until the print mode is set.

Figure 32:
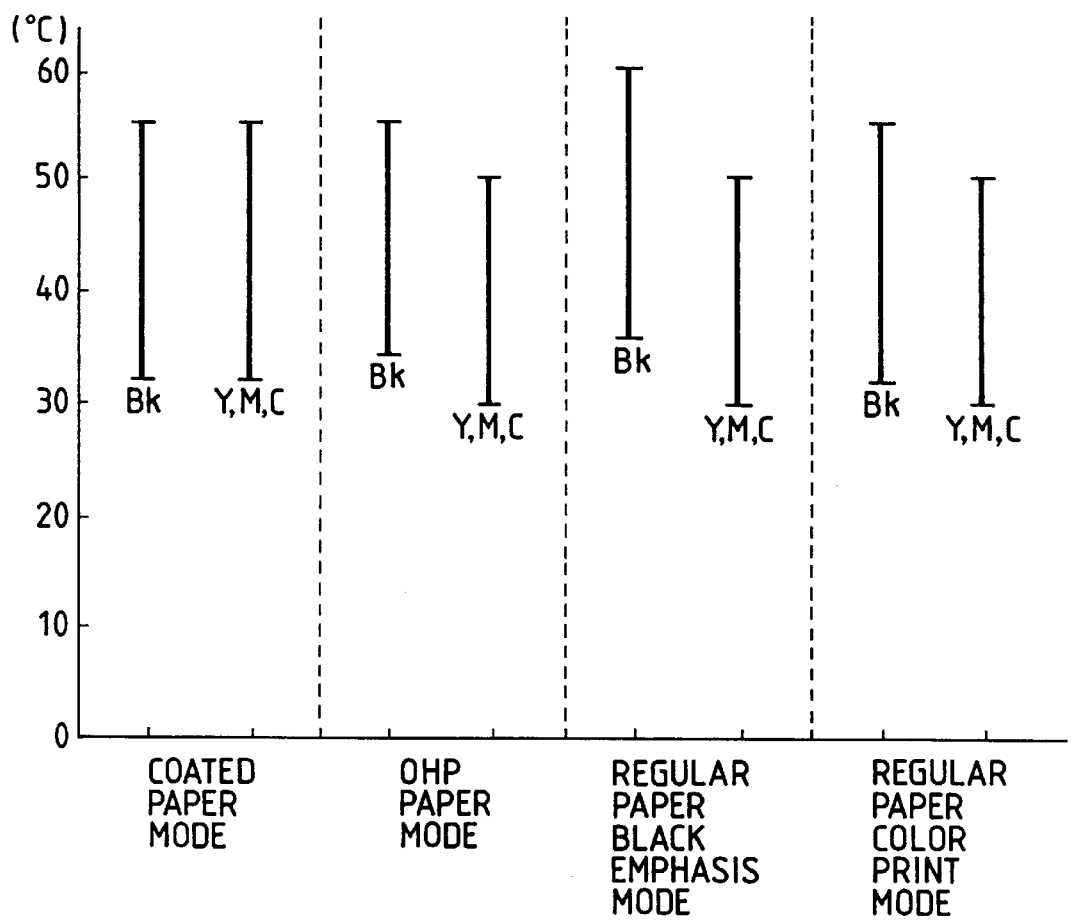
FIG. 32 is a graph showing use temperature ranges of recording heads.

FIG. 32 summarizes the use temperature ranges of the Bk recording head and the Y, M, and C recording heads in the respective print modes.

If the upper limit of the use temperature range $T_1$ in the coated paper mode of the Bk recording head is represented by $T_{1MAX}$, the upper limit of the use temperature range $T_2$ in the OHP paper mode is represented by $T_{2MAX}$, the upper limit of the use temperature range $T_3$ in the regular paper black emphasis mode is represented by $T_{3MAX}$, and the upper limit of the use temperature range $T_4$ in the regular paper color print mode is represented by $T_{4MAX}$, a relation $T_{1MAX} \leq T_{2MAX} \leq T_{4MAX} < T_{3MAX}$ is satisfied.

If the lower limit of the use temperature range $T_1$ in the coated paper mode of the Bk recording head is represented by $T_{1MIN}$, the lower limit of the use temperature range $T_2$ in the OHP paper mode is represented by $T_{2MIN}$, the lower limit of the use temperature range $T_3$ in the regular paper black emphasis mode is represented by $T_{3MIN}$, and the lower limit of the use temperature range $T_4$ in the regular paper color print mode is represented by $T_{4MIN}$, a relation $T_{1MIN} \leq T_{4MIN} < T_{2MIN} < T_{3MIN}$ is satisfied.

If the upper limit of the use temperature range $T_{11}$ in the coated paper mode of each of the Y, M, and C recording heads is represented by $T_{11MAX}$, the upper limit of the use temperature range $T_{12}$ in the OHP paper mode is represented by $T_{12MAX}$, the upper limit of the use temperature range $T_{13}$ in the regular paper black emphasis mode is represented by $T_{13MAX}$, and the upper limit of the use temperature range $T_{14}$ in the regular paper color print mode is represented by $T_{14MAX}$, a relation $T_{11MAX} > T_{12MAX} \geq T_{13MAX} \geq T_{14MAX}$ is satisfied.

If the lower limit of the use temperature range $T_{11}$ in the coated paper mode of each of the Y, M, and C recording heads is represented by $T_{11MIN}$, the lower limit of the use temperature range $T_{12}$ in the OHP paper mode is represented by $T_{12MIN}$, the lower limit of the use temperature range $T_{13}$ in the regular paper black emphasis mode is represented by $T_{13MIN}$, and the lower limit of the use temperature range $T_{14}$ in the regular paper color print mode is represented by $T_{14MIN}$, a relation $T_{11} > T_{12MIN} \geq T_{13MIN} \geq T_{14MIN}$ is satisfied.

Furthermore, relations $T_{1MAX} \geq T_{11MAX} > T_{12MAX}$, $T_{3MAX} > T_{13MAX}$, $T_{4MAX} > T_{14MAX}$, $T_{1MIN} \geq T_{11MAX}$, $T_{2MIN} > T_{12MIN}$, $T_{3MIN} > T_{13MIN}$, and $T_{4MIN} > T_{14MIN}$ are satisfied.

Figure 25:
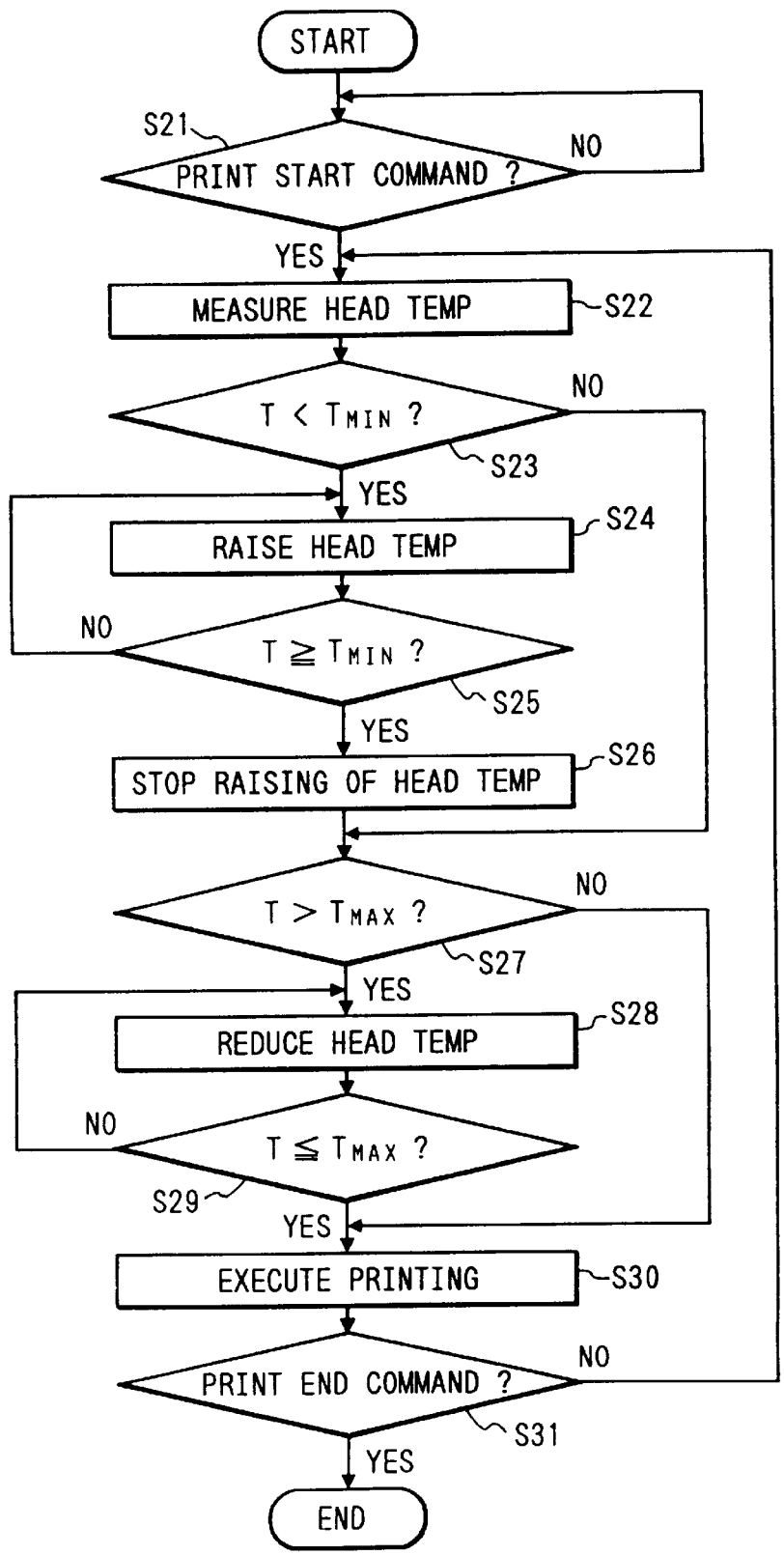
FIG. 25 is a flow chart showing a temperature control operation of the recording head.

Then, a temperature control operation executed by the CPU 115A of the controller 115 will be described below. FIG. 25 is a flow chart showing a temperature control operation executed depending on whether the temperature T of the recording head 102 exceeds the upper limit temperature $T_{MAX}$ or is below the lower limit temperature $T_{MIN}$.

Note that the recording head 102 includes the heads 102A, 102B, 102C, and 102D in this embodiment, and these recording heads have the same arrangement, except that the colors of inks ejected therefrom are different from each other. The following temperature control operation is performed for respective recording heads. In the following description, the temperature T is a generic name of the temperatures of the recording heads.

In step S21, the presence/absence of a print start command is checked. As a result, if it is determined that the print start command is input (YES in step S21), the temperature of the recording head is measured in step S22.

Thereafter, in step S23, it is checked if the temperature T of the recording head 102 is lower than the lower limit temperature $T_{MIN}$ of the set use temperature range. If it is determined that the temperature T is equal to or higher than the lower limit temperature $T_{MIN}$ (NO in step S23), the control advances to step S27. If it is determined that the temperature T is lower than the lower limit temperature $T_{MIN}$ (YES in step S23), the heater unit 123 is heated in step S24 to increase the temperature of the recording head. It is then checked in step S25 if the temperature T of the recording head 102 exceeds the lower limit temperature $T_{MIN}$. If it is determined that the temperature T of the recording head 102 exceeds the lower limit temperature $T_{MIN}$ (YES in step S25), the heating operation of the heater unit 123 is stopped in step S26 to stop the temperature rise of the recording head. Thereafter, the flow advances to step S27. On the other hand, if it is determined that the temperature T is lower than the lower limit temperature $T_{MIN}$ (NO in step S25), the flow returns to step S24, and the heating operation by the heater unit 123 is continued to increase the temperature of the recording head.

It is checked in step 527 if the temperature of the recording head 102 is higher than the upper limit temperature $T_{MAX}$ of the set use temperature range. If it is determined that the temperature T is equal to or lower than the upper limit temperature $T_{MAX}$ (NO in step S27), the flow advances to step S30 to execute the printing operation. If it is determined that the temperature of the recording head 102 exceeds the upper limit temperature $T_{MAX}$ (YES in step S27), supply of print data to the recording head is stopped in step S28, and the control waits until the temperature of the recording head is decreased.

It is then checked in step S29 if the temperature of the recording head 102 is decreased below the upper limit temperature $T_{MAX}$. If it is determined that the temperature T is below the upper limit temperature Tea (YES in step S29), the flow advances to step S30 to execute the printing operation. On the other hand, if it is determined that the temperature T exceeds the upper limit temperature $T_{MAX}$ (NO in step S29), the flow returns to step S28 to continuously decrease the temperature of the recording head. In step S31, the presence/absence of a print end command is checked. If it is determined that the print end command is issued (YES in step S31), the printing operation is ended.

In the above description, when the temperature of the recording head exceeds the predetermined upper limit temperature, the recording head is set in a standby state to wait until the temperature is decreased. However, the present invention is not limited to this. For example, the temperature of the recording head may be decreased by decreasing the carriage movement speed to decrease the ejection frequency, or by driving a cooling fan.

Eighth Embodiment

Another embodiment of the present invention will be described below. This embodiment has as its object to set optimal use temperature ranges in units of recording heads by measuring the print density characteristics in units of recording heads.

This embodiment exemplifies a color ink jet recording apparatus, which mounts yellow, magenta, cyan, and black recording heads (102A, 102B, 102C, and 102D) shown in FIG. 26. In FIGS. 26 and 28, a density detect means 501 is arranged near the recording heads. Although not shown in FIG. 28, an A/D converter for converting an analog output into a digital signal is arranged between the density detect means 501 and a controller 115. An electrical signal output from the density detect means 501 is converted by the A/D converter, and the converted signal is input to the controller 115. Note that a test pattern in the following embodiment is a solid pattern.

Figure 33:
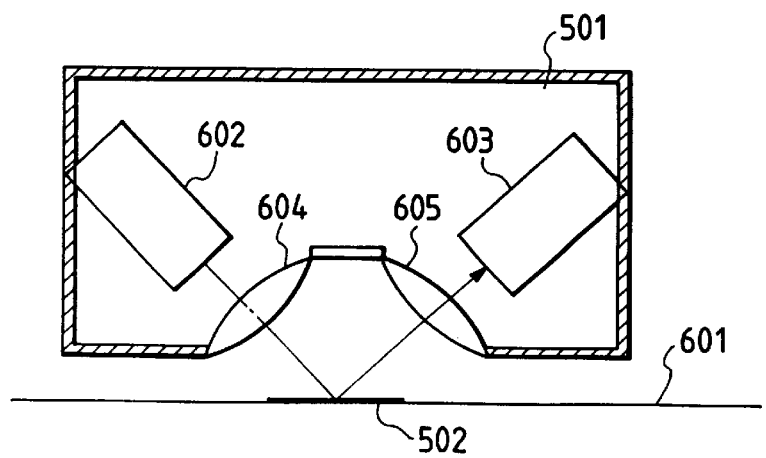
FIG. 33 is a view showing a density detection means.

In FIG. 26, test patterns 502 are read by the density detect means 501. FIG. 33 is a view showing the density detect means 501. The test patterns 502 are formed on a recording medium 601. A light source 602 radiates infrared rays onto the surface of the recording medium 601 through a lens 604, and light reflected by the surface is read by a read sensor 603 through a lens 605. A paper width sensor may be commonly used as the light source and the read sensor.

Figure 34:
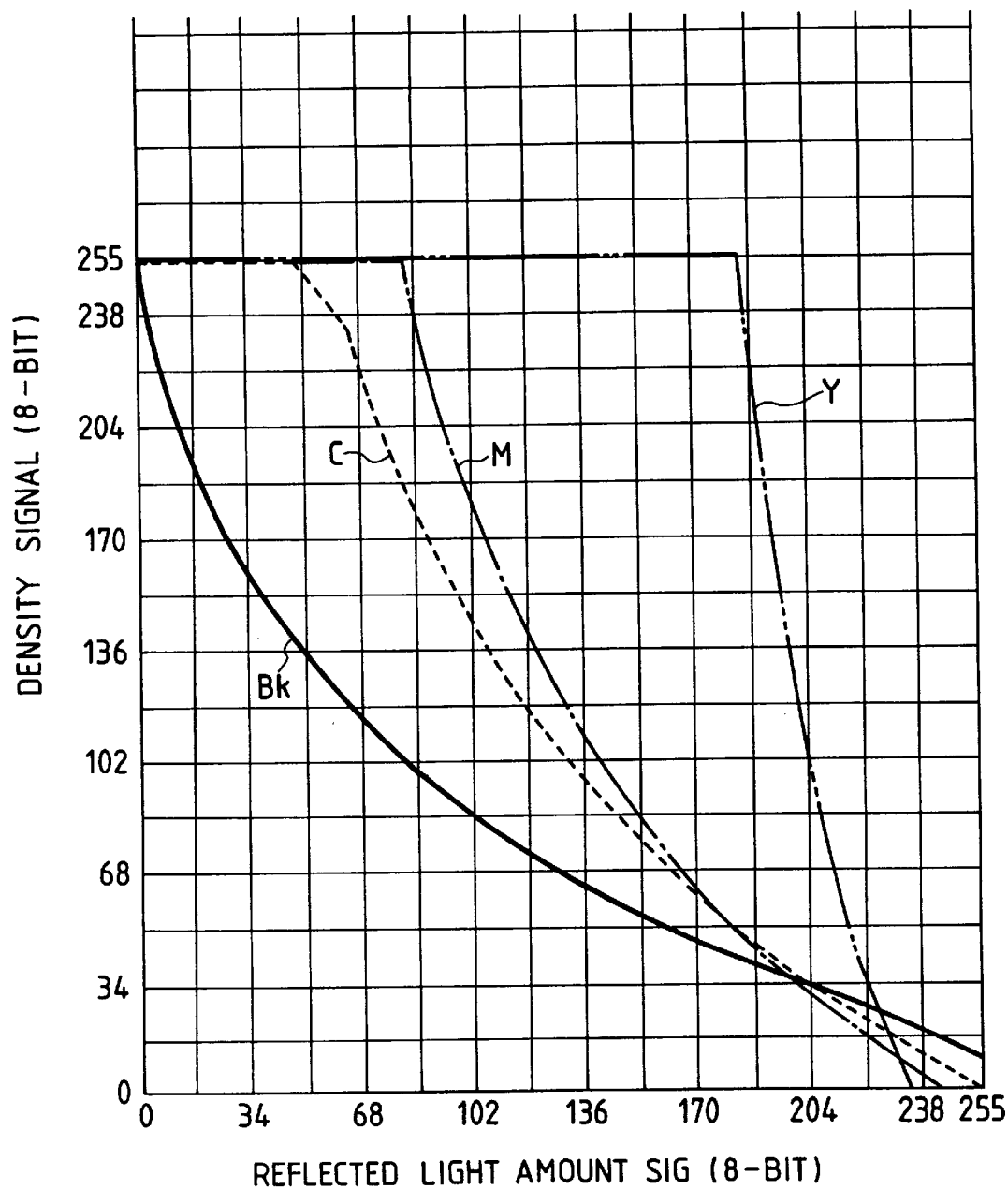
FIG. 34 is a graph showing an example of a print density comparison table.

When the light source 602 is turned on, and infrared rays are radiated, the read sensor 603 receives light reflected by the recorded test pattern 502, and outputs an electrical signal proportional to the received light amount. When the test pattern is constituted by different colors like Y. M, C, and Bk, since the relationship between the electrical signal level output from the read sensor 603 and the corresponding actual density varies in units of colors, it must be corrected. Thus, the relationship is corrected using print density comparison tables in units of colors shown in FIG. 34, so that the following density calculation is made. In FIG. 34, an 8-bit reflected light amount signal is plotted along the abscissa, and an 8-bit density signal is plotted along the ordinate. The reflected light amount signal can be converted into the density signal according to Y, M, C, and Bk curves.

Figure 35:
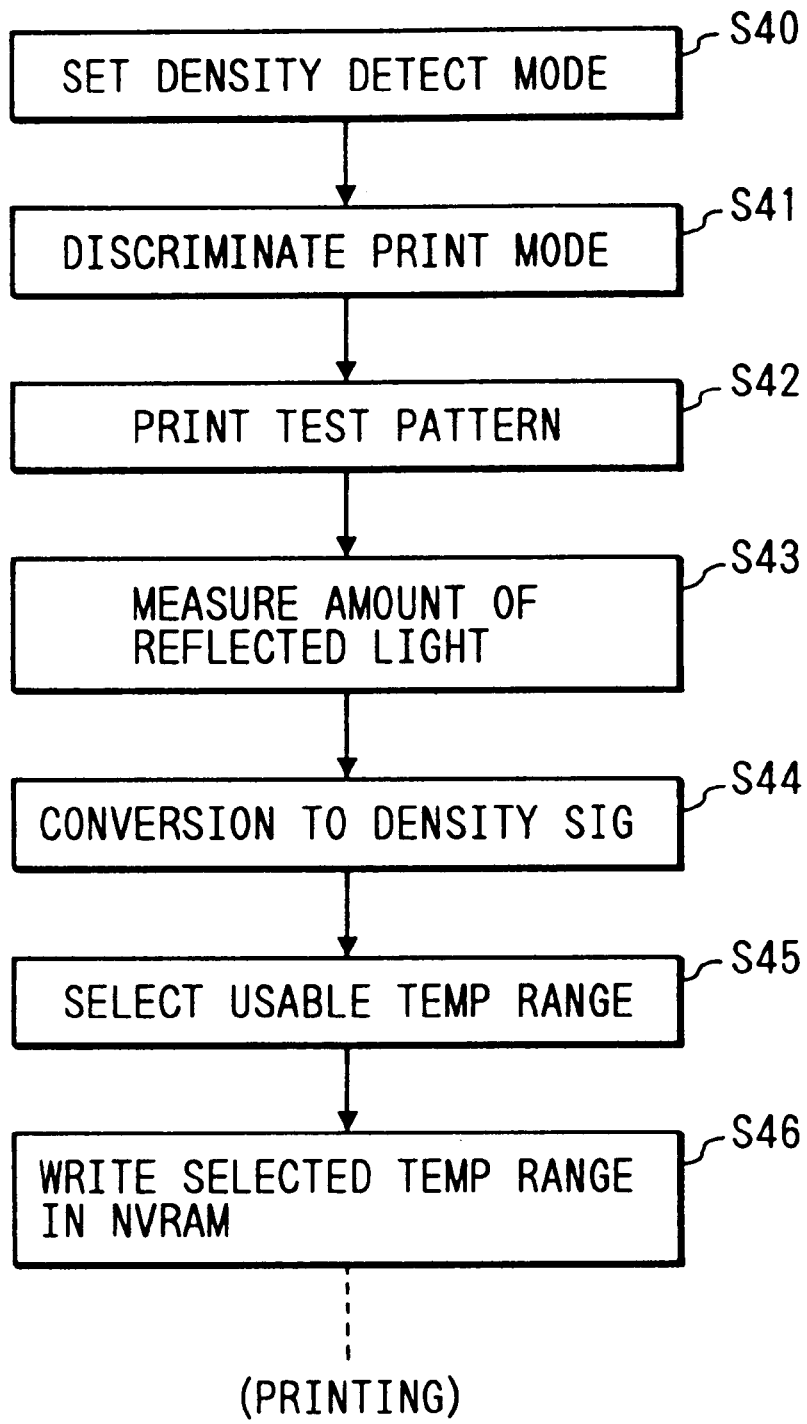
FIG. 35 is a flow chart showing an example of a density detection sequence, and a temperature range setting sequence.

A test pattern density detect sequence and a use temperature range setting sequence will be described below with reference to the block diagram of FIG. 28, and the flow chart shown in FIG. 35. When a density detect mode is set in step S40, a print mode is checked in step S41 to determine if the print mode is a coated paper mode, an OHP paper mode, a regular paper mode, or a regular paper black emphasis mode. The controller 115 supplies a print signal to the recording heads 102A, 102B, 102C, and 102D through a head driving system 190 while setting an 8-bit density signal level to be 128, thus causing these heads to print a test pattern (step S42).

The test pattern is printed in such a manner that a pattern generator (not shown) generates a pattern for driving all the recording elements of the recording heads with the same driving signal. At this time, the four color recording heads are set at a predetermined temperature $T_0$. The light source 602 of the density detect means 501 radiates infrared rays onto the test patterns 502, and light reflected by the test pattern is received by the read sensor 603. The read sensor outputs a signal proportional to the received light amount. This signal is A/D-converted by the A/D converter, and the digital value is input to the controller 115. The controller then measures the input value (step S43).

The reflected light amount is measured by sequentially scanning the density detect means 501 (FIG. 26) along the test patterns 502 in the main scan direction in units of test patterns printed by the four color recording heads. A CPU 115A of the controller 115 converts a signal proportional to the received light amount sent from the read sensor 603 into a density signal using the print density comparison tables in units of colors (FIG. 34) stored in a ROM 115B in correspondence with print modes (step S44).

The ROM 115B stores a plurality of use temperature range values of each recording head in correspondence with print modes according to the magnitude of the density signal. For example, when the print mode determined in step S41 is the OHP paper mode, and when the standard use temperature range of the Bk recording head is a range between 34° C. to 55° C., if the magnitude of the 8-bit density signal obtained by measuring the reflected light amount of the actually recorded test pattern falls within a range between, e.g., 168 and 240, and it is determined that the density is relatively high, the ejection quantity of the Bk recording head is too large in this state. Thus, a use temperature range between 32° C. to 50° C. is set to correct the ejection quantity to be decreased.

On the other hand, if the magnitude of the 8-bit density signal falls within a range between, e.g., 50 and 88, and it is determined that the density is relatively low, since the ejection quantity of the recording head is relatively small, a use temperature range between 36° C. and 60° C. is set to correct the ejection quantity to be increased. In this manner, a plurality of use temperature ranges are stored in the ROM 115B. The CPU 115A selects optimal use temperature ranges corresponding to the magnitude of the density signal in units of recording heads from the ROM 115B (step S45). Then, the CPU 115A writes the selected use temperature range in an NVRAM 115D (step S46). When the magnitude of the 8-bit density signal falls within a range between 0 and 49, or 241 and 255, an ejection error is determined, and the printing operation is not performed.

Thereafter, the temperature control of the recording heads is performed according to the set use temperature ranges, and the printing operation is performed according to the print mode determined in step S41. Note that in step S40, the temperature detection mode can be set by operating the panel 110 or by setting a command from the host computer. When the command is set from the host computer, a special command is provided to the ink jet recording apparatus, so that the command can be designated from the host computer.

In this embodiment, as described above, a plurality of use temperature ranges are stored in the ROM 115B in correspondence with the magnitudes of the density signal. For example, when three use temperature ranges are prepared for the Bk recording head in each print mode, and when the print mode includes four modes, i.e., the coated paper mode, OHP paper mode, regular paper mode, and regular paper black emphasis mode, a total of 3×4=12 different use temperature ranges are prepared for the Bk recording head.

FIG. 36 shows the use temperature ranges of the recording heads in units of print modes and density characteristics of the recording heads. In FIG. 36, a higher density is determined when the magnitude of the 8-bit density signal falls within a range between 168 and 240, a standard density is determined when the magnitude of the 8-bit density signal falls within a range between 89 and 167, and a lower density is determined when the magnitude of the 8-bit density signal falls within a range between 50 and 88.

In this manner, according to this embodiment, since an optimal use temperature range is selected from many use temperature ranges according to the density characteristics inherent to each recording head, precise temperature control for the recording head can be realized, and density variations among recording heads can be eliminated, thus obtaining a uniform density. As a result, the effect of the present invention can be further improved.

Ninth Embodiment

Figure 37:
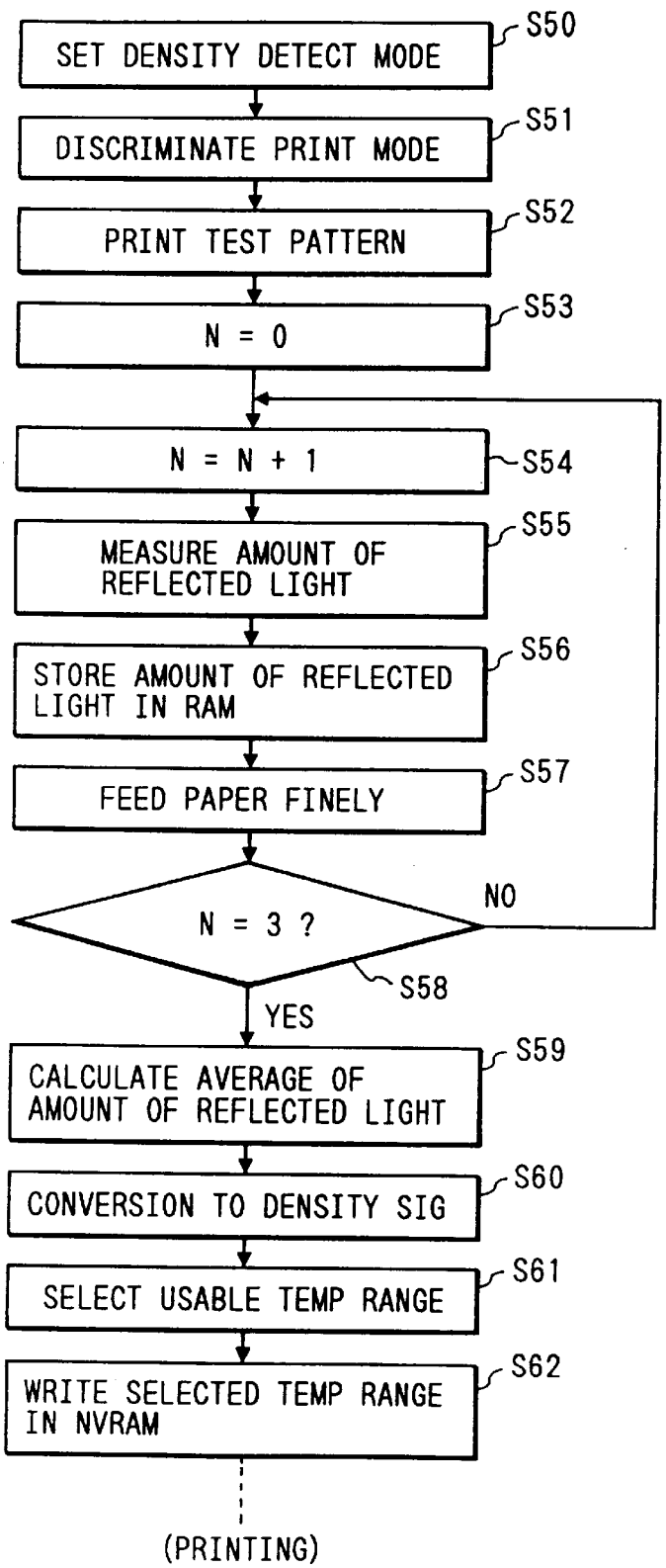
FIG. 37 is a flow chart showing another example of a density detection sequence, and a temperature range setting sequence.

Still another embodiment of the present invention will be described below. A difference from the above embodiment is that a density detection operation is performed a plurality of number of times for a single color test pattern in order to eliminate variations in density calculated from the reflected light amount of the test pattern and to improve precision, and an average value of the densities is calculated. A test pattern density detect sequence and a use temperature range setting sequence of this embodiment will be described below with reference to the flow chart shown in FIG. 37. Note that a description of the same portions as those already described with reference to the flow chart shown in FIG. 35 will be omitted.

After test patterns are printed in step S52, a count value N of a controller 115 is reset (step S53). After the count value N is incremented by 1 (step S54), a reflected light amount is measured (step S55). The measured reflected light amount is stored in a RAM 115C (step S56), and paper is fed finely in the sub-scan direction to allow, e.g., a total of three density detection operations for a single test pattern (step S57). This operation is repeated until N=3 (step S58).

A CPU 115A then reads out three reflected light amount values stored in the RAM 115C, and calculates their average value (step S59). Thereafter, the CPU 115A converts the calculated average value of the reflected light amounts into a density signal using print density comparison tables (FIG. 34) stored in the ROM 115B (step S60). The subsequent steps are executed in the same manner as in the above-mentioned embodiment.

In the density detection operation, in order to increase the S/N ratio of the reflection density of the test pattern, reading precision of reflected light can be improved by using a recording medium having a large whiteness index. The test pattern for each color is desirably printed to have the same area. If the test patterns have different implantation areas, an OD (average optical density) value may include an error under the influence of a difference in temperature rise of the recording heads.

According to the present invention, recording is performed while controlling the temperatures of the plurality of recording heads for performing recording by ejecting inks by utilizing heat energy in the ink jet recording apparatus so as not to fall outside predetermined temperature ranges set for respective recording heads.

Therefore, even when a print operation is performed not only on coated paper but also on a recording medium such as regular paper or OHP paper, which has poor fixing characteristics, and which cannot provide a sufficient OD (average optical density) value as compared to the coated paper, use temperature ranges are set for respective recording heads. In particular in a color recording mode, since the use temperature range of the black ink recording head can be set to be different from that of each of the other monochrome ink recording heads, the print density of black characters and lines can be increased. Furthermore, since the ink implantation quantity on a color recording portion obtained by mixing colors is suppressed, improvement of fixing characteristics and prevention of boundary blur can be attained. As a result, an image with high print quality can be recorded.

When print density characteristics are measured for respective recording heads, optimal use temperature ranges can be set in units of recording heads. Thus, the effects of the present invention can be further improved.

Tenth Embodiment

Tenth embodiment of the present invention will be described referring to a block diagram shown in FIG. 41 and a flow chart shown in FIG. 42.

Figure 42:
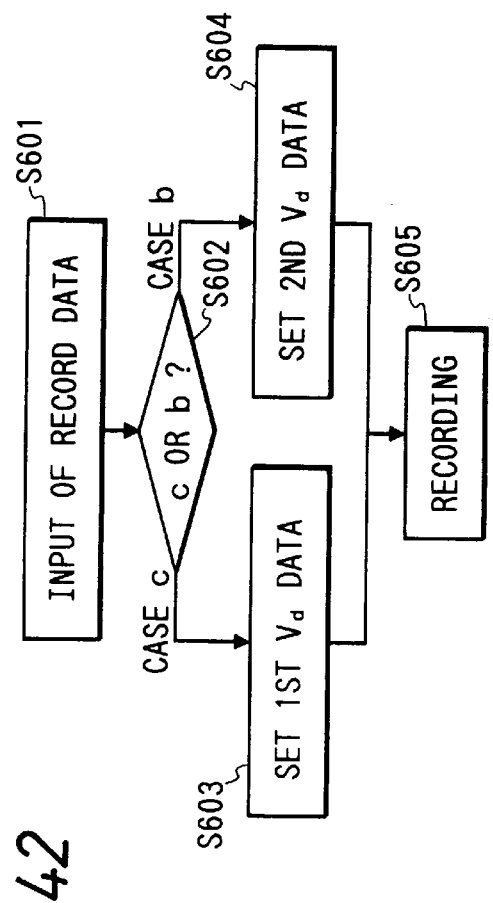
FIG. 42 is a flow chart useful for understanding operation of the tenth embodiment.

A data discriminator unit 902 determines whether record data entered a record data input unit 901 is bit map data (b) or character code data (c) (steps S601 and S602 in FIG. 42). If it is determined as the bit map data (b), such data is converted into data of a first ejection amount Vd through a first ejection amount data generator unit 903 (step S603). If it is determined as the character code data (c), such data is converted into data of a second ejection amount Vd more than an ejection amount in regular recording through a second ejection amount data generator unit 904 (step S604). In a case where it is converted into the data of the second ejection amount Vd, recording is performed in black (K) ink as a designated color. While the designated color is usually a black (K), it is also permissible to adopt any of colors C, M, and Y, or their combination. The designated color is determined by input data.

Next, those data are transferred to a record head driver unit 909 so as to drive a recording head 905 (step S605). This provides such a control that an amount of ink ejection per dot in a bit map data recording mode is less than that in a character data recording mode.

Figure 41:
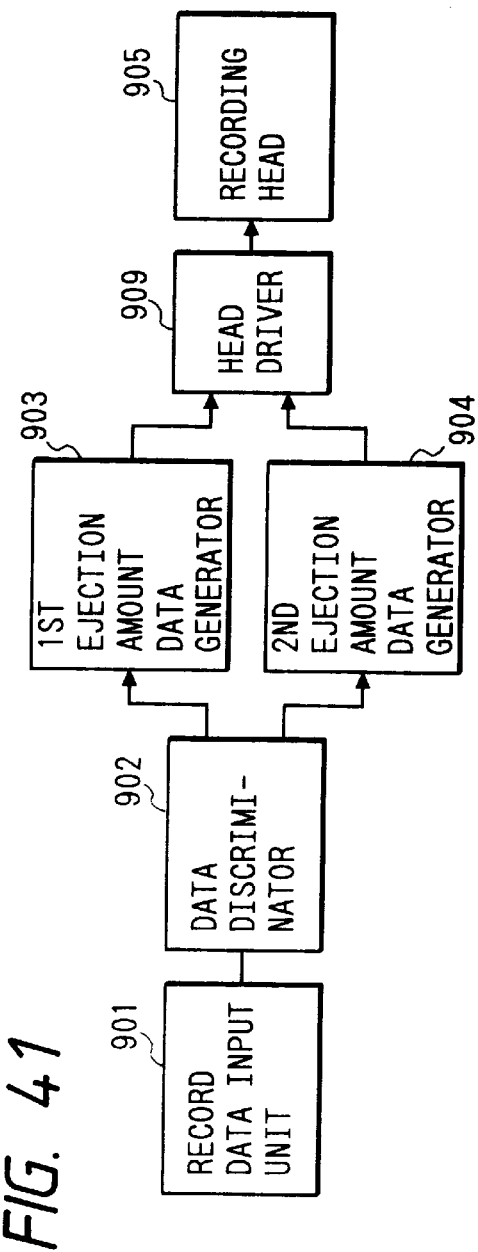
FIG. 41 is a block diagram useful for explanation of the tenth embodiment according to the present invention.
Figure 43:
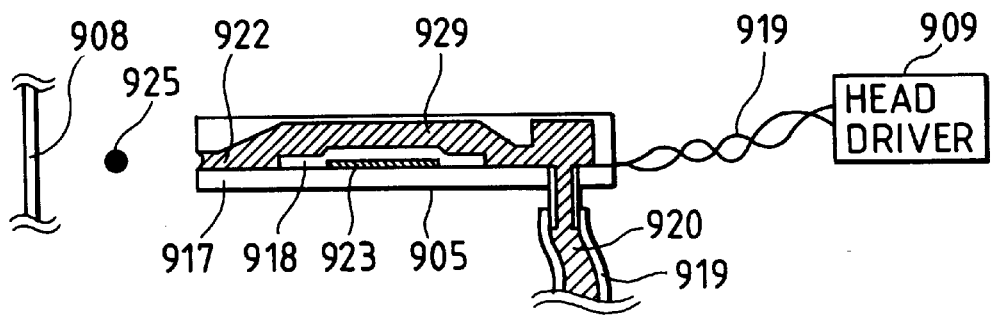
FIG. 43 is a sectional view of a recording head of the tenth embodiment.
Figure 44:
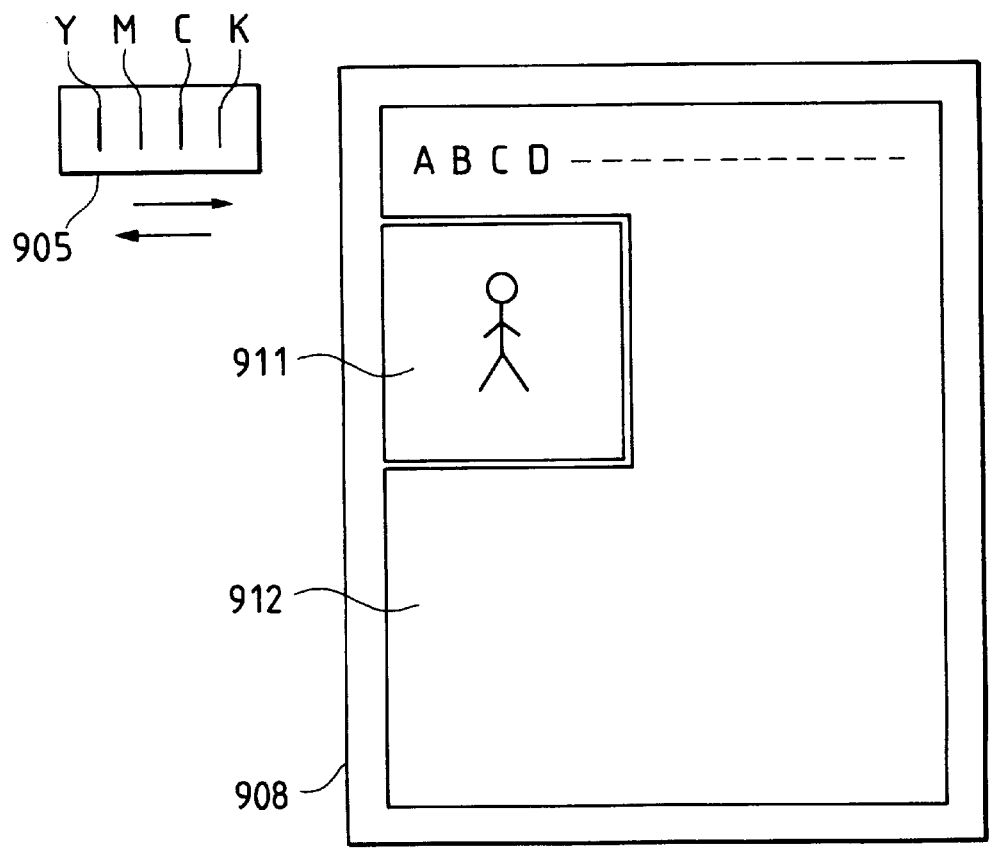
FIG. 44 is a view illustrating an example of an output onto the recording medium according to the tenth embodiment.

FIG. 43 is a sectional view of the recording head 905 shown in FIG. 41. In FIG. 43, an ejection of an ink droplet 925 from the recording head 905 is implemented by bubbles in the ink which are induced when a heater element 923 is heated by applying an electric energy from the record head driver unit 909 to the heater element 923 provided near a nozzle (ejection portion) 922. The recording head 905 relatively moves with respect to a sheet paper 908 as a recording medium. In FIG. 44 which illustrates an example of an output onto the recording medium 908, the arrow indicates a direction X and denotes a main scan direction. An orthogonal direction Y denotes a sub-scan direction.

In a recording method of ink per a pixel on a sheet paper, for an image signal to be recorded, which have been previously input, colors C, M, and Y are not recorded on the portion of the color K, or color C+M+Y is replaced by the color K. That is, for recording, there are eight cases such as K, C, M, Y, C+M, M+Y, Y+C, and non-recording.

An arrangement pitch of the respective color of nozzles of the recording head 905 is given with about 70.6 micron, and is the same as the pitch of the recording pixel. That is, the recording is performed with recording density of 360 dpi. The recording head 905 is provided with four groups of nozzles corresponding to four colors of ink, i.e. yellow (Y), magenta (M), cyan (C) and black (K), respectively, each group comprising 64 nozzles. The nozzles of each color are arranged substantially in straight, and in parallel for each color as shown in FIG. 44.

An average value of an amount of ink ejection from the respective nozzle is about 40 pl (pico litter) as to each of colors C, M and Y in case of the first Vd, and is about 48 pl as to color K. As for color K, the value is 1.2 times that of each of colors C, M and Y. In case of the second Vd, it is about 60 pl as to color K.

A variable control for the Vd (an amount of ink ejection) is performed as follows.

Figure 45:
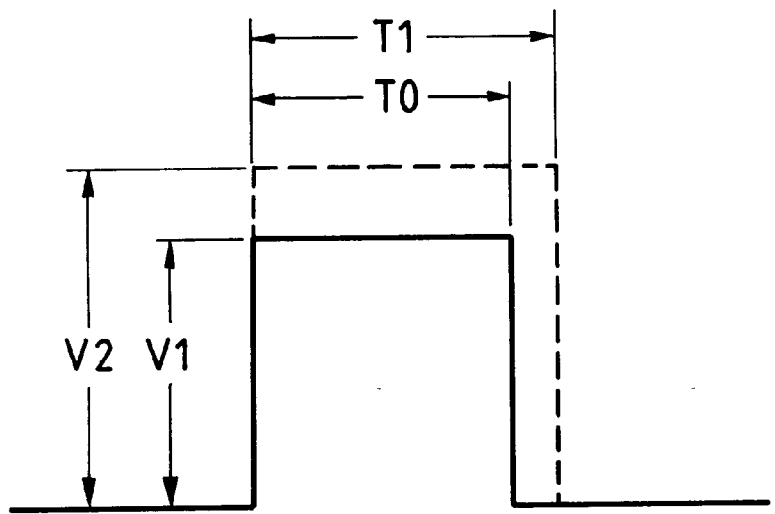
FIG. 45 is a view showing a driving wave form for the recording head according to the tenth embodiment.

FIG. 45 is a view showing a driving wave form for the recording head 905, which is a voltage control pulse applied to the heater element 923. In case of the first Vd, such a pulse takes a square wave having a voltage V0 and a pulse width T0, and in case of the second Vd, such a pulse takes a square wave having a voltage V0 and a pulse width T1. It is also permissible that such a pulse takes a square wave having a voltage V1 and a pulse width T0 or T1. That is, it is required that the energy applied to the heater element 923 is greater in the second Vd than in the first Vd. This makes it possible to slightly vary the ink ejection amount Vd in extent such that it is effective in the present embodiment.

In FIG. 44, an image record portion 911 recorded on the sheet paper 908 as the recording medium is of the bit map data, and a character record portion 912 is of the character code data. An amount of ink ejection for K on the image record portion 911 is less than that on the character record portion 912.

Thus, a recording quality for color K in the character record portion 912 is maintained at high level, while the image record portion 911 is free from the mixed color of ink and thus recorded with a high quality.

Incidentally, the recording medium is not restricted to a general paper, and may be for example a sheet or an OHP sheet.

Eleventh Embodiment

While control of the ink ejection amount Vd is performed with a single square wave as a driving wave for the recording head 905 in the tenth embodiment, the present invention is not restricted to such control by one square wave.

Figure 46:
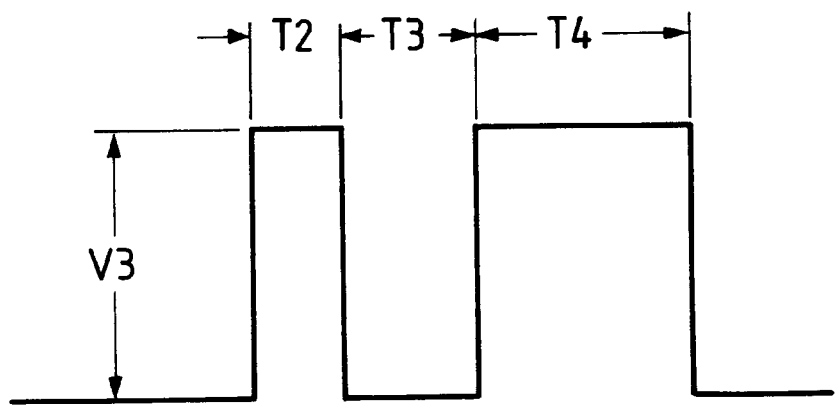
FIG. 46 is a view showing a driving wave form for the recording head according to the eleventh embodiment.

FIG. 46 shows an example for driving the driving head using two square waves. First, a first pulse of a voltage V3 is applied during a period of time T2. Subsequently, after time T3, a second pulse is applied during a period of time T4. At that time, the ink ejection amount Vd is controlled by slightly varying a pulse width T2 of the first pulse or a pulse width T4 of the second pulse.

As another way, it is permissible to vary only the time interval T3, fixing the voltage V3, the pulse width T2 and the pulse width T4. In this case, electric energy applied to the heater element 923 of the recording head 905 is kept constant.

Twelfth Embodiment

While an ejection of an ink droplet from the recording head 905 is implemented by bubbles in the ink which are induced when a heater element 923 is heated by applying an electric energy from the record head driver unit 909 to the heater element 923 provided near a nozzle 922, in the tenth embodiment, the present invention is not restricted to such ink ejection by bubbles.

Figure 47:
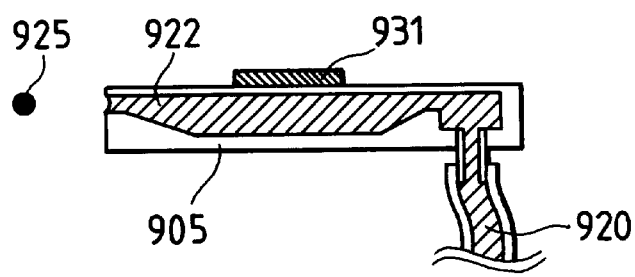
FIG. 47 is a sectional view of a recording head according to the twelfth embodiment.

It is also permissible that an ejection of an ink droplet is implemented by applying an electric energy to an electric-mechanical conversion element provided near a nozzle 922 of the recording head 905. FIG. 47 shows the use of a type of recording head such that an ink is ejected by applying an electric energy to a piezoelectric element 931 as the electric-mechanical conversion element. The use of such a type of recording head can also bring the same effect as the tenth embodiment.

Thirteenth Embodiment

According to the tenth embodiment, the recording head 905 is provided with four groups of nozzles corresponding to four colors of ink i.e. yellow (Y), magenta (M), cyan (C) and black (K), respectively, each group comprising 64 nozzles. The nozzles of each color are arranged substantially in straight, and in parallel for each color. However, the present invention is not restricted to such nozzle arrangement.

Figure 48:
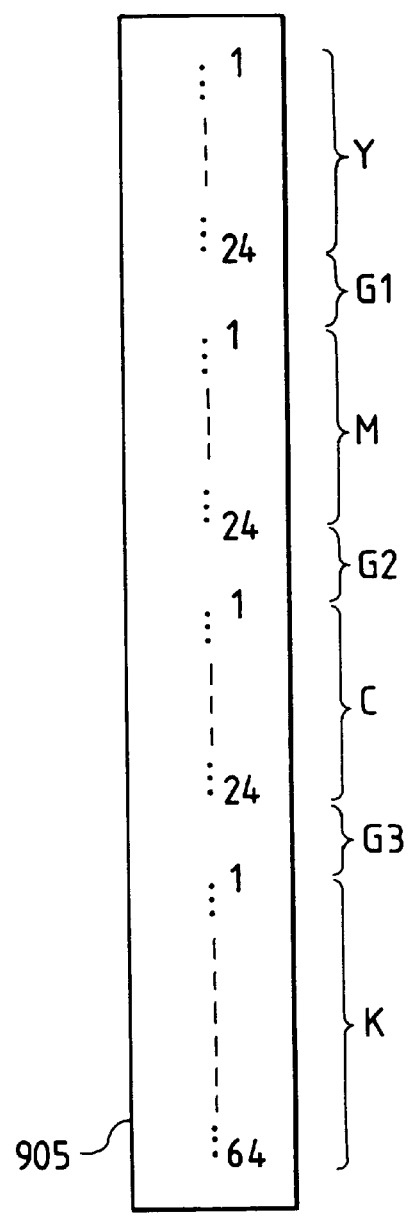
FIG. 48 is a view showing a nozzle arrangement of a recording head according to the thirteenth embodiment.

FIG. 48 shows an example of an arrangement for nozzles in which the nozzles for each of colors C, M and Y comprise 24 pieces, and the nozzles of color K comprise 64 pieces. The nozzles are arranged at intervals of the corresponding 8 nozzles among the groups involved in the colors C, M and Y of nozzles, and arranged at intervals of the corresponding 16 nozzles between the group involved in the color K and the groups involved in the colors C, M and Y of nozzles. All of the nozzles are disposed substantially in straight.

The recording head having such an arrangement is manufactured in a unitary body, and thus it is possible to expect such advantages that the manufacturing cost is inexpensive, and there is no need for positional adjustment among the respective color groups of nozzles. In addition, it is possible to expect such an advantage that mixing of color hardly occurs, since a plurality of colors of ink are simultaneously recorded with respect to the main scan direction.

Thus, such a recording head also makes it possible to expect an effect of the present invention as a recording method aiming at a high quality of image.

As described above, according to the tenth to thirteenth embodiments, an amount of ink ejection per dot in a bit map data recording mode is less than that in a character code data recording mode. This feature makes it possible to enhance a quality in recording of the character code data, and in addition to avoid an occurrence of the mixed color (blur) by different inks in the bit map data recording mode.

Thus, according to the present invention, even if a sheet of recording medium contains an image record portion for the bit map data and a character record portion for the character code data, it is possible to record those with high quality.

The present invention brings about excellent effects particularly in a recording apparatus of the ink jet system for performing recording by forming flying ink droplets by utilizing heat energy, among the ink jet recording systems. The typical structure and operational principles are preferably the ones disclosed in U.S. Pat. Nos. 4,723,129 and 4,740,796. This system is applicable to either a so-called on-demand type recording system or a continuous type recording system. Particularly, this system is effectively applicable to the on-demand type system for the following reasons. When at least one driving signal that corresponds to recording information, and which can give abrupt temperature rise exceeding nucleate boiling is applied to an electrothermal converting element arranged in correspondence with a sheet or liquid channel, which holds an ink, the electrothermal converting element generates heat energy, the heat energy causes film boiling on a heat acting surface of a recording head, and consequently, a bubble can be formed in the liquid (ink) in one-to-one correspondence with the driving signal. Upon growth and contraction of this bubble, the liquid (ink) is ejected through an ejection orifice, thereby forming at least one droplet. It is more preferable to define this driving signal to have a pulse waveform since a bubble can grow and contract instantaneously, and in particular, the liquid (ink) can be ejected in a short response time.

As the driving signal having the pulse waveform, signals disclosed in U.S. Pat. Nos. 4,463,359 and 4,345,262 are suitable. Further excellent recording can be realized when conditions disclosed in U.S. Pat. No. 4,313,124 of the invention associated with the temperature rise rate of the heat acting surface are adopted.

As the structure of the recording head, in addition to a structure (linear liquid channel or a right-angle liquid channel) as a combination of ejection orifices, liquid channels, and electrothermal converting elements disclosed in the above-mentioned specifications, structures disclosed in U.S. Pat. Nos. 4,558,333 and 4,459,600 disclosing a structure having a heat acting structure arranged in a flexed region may be used. In addition, the recording head may be arranged based on Japanese Laid-Open Patent Application No. 59-123670 that discloses a structure wherein a common slit is used as an ejection portion for a plurality of electrothermal converting elements, or Japanese Laid-Open Patent Application No. 59-138461 that discloses a structure wherein an opening for absorbing a pressure wave of heat energy is formed in correspondence with the ejection portion.

Furthermore, as a full-line type recording head having a length corresponding to the maximum width of a recording medium, which can be used in recording of a recording apparatus, either a structure which satisfies this length by combining a plurality of recording heads or a structure as an integrally formed single recording head may be employed. In addition, an exchangeable chip type recording head, which enables electrical connection to the apparatus main body or supply of ink from the apparatus main body by being mounted onto the apparatus main body, or a cartridge type recording ead, which has an ink tank provided integrally on the recording head itself, may be used.

It is preferable to add a recovery means, a preliminary auxiliary means, and the like for the recording head since they can further stabilize the effect of the present invention. For example, such recovery means includes capping means and cleaning means for the recording head, pressing or suction means, and preheating means which may comprise an electrothermal converting element, or another heating element, or a combination thereof. In addition, it is also effective to execute a preliminary ejection mode independently of a recording mode since recording can be stabilized.

Moreover, in the embodiments of the present invention, an ink is described as a liquid. Alternatively, the present invention may employ an ink which is solidified at room temperature or less, and is softened or liquefied at room temperature, or an ink, which is liquefied upon application of a use recording signal since it is a general practice to perform temperature control of the ink itself within a range between 30° C. and 70° C. in an ink jet system so that the ink viscosity can fall within a stable ejection range.

In addition, a temperature rise caused by heat energy may be prevented by positively utilizing the temperature rise as energy for a change in state from a solid state to a liquid state of the ink, or an ink which is solidified in a non-use state for the purpose of preventing evaporation of the ink may be used. In any case, the present invention can be applied to a case wherein an ink, which can be liquefied by heat energy such as an ink which is liquefied upon application of heat energy according to a recording signal, and is ejected in a liquid state, an ink which begins to be solidified when it reaches a recording medium, or the like may be used. In this case, an ink may be held in a liquid or solid state in recess portions or through holes of a porous sheet, as described in Japanese Laid-Open Patent Application No. 54-56847 or 60-71260, and the porous sheet may be arranged to oppose electrothermal converting elements. In the present invention, the above-mentioned film boiling system is most effective for the above-mentioned inks.

In addition, the ink jet recording apparatus of the present invention may be used as a built-in or stand-alone image output terminal of information processing equipment such as a wordprocessor, a computer, or the like, or a copying machine as a combination with a reader, and the like, or a facsimile apparatus having sending and receiving functions.

Figure 38:
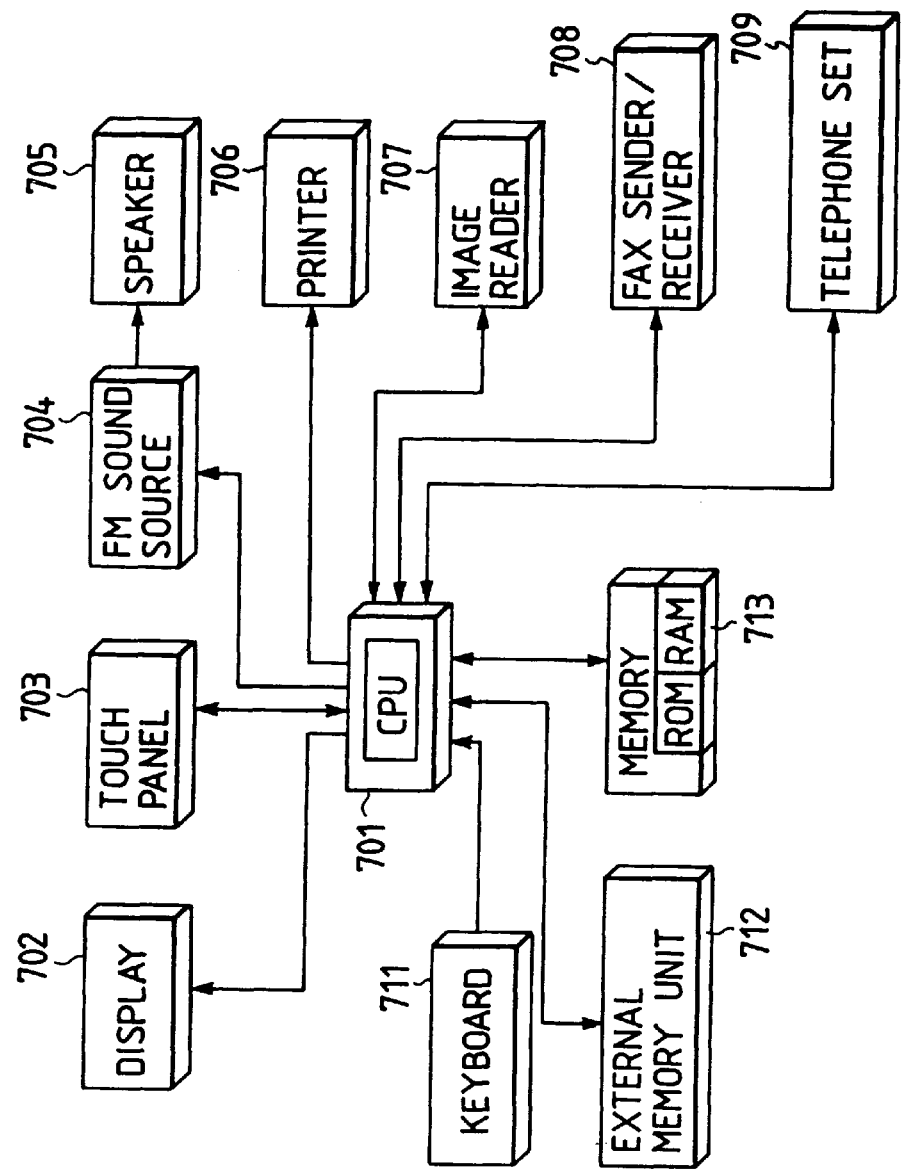
FIG. 38 is a schematic block diagram showing an arrangement obtained when the recording apparatus of the present invention is applied to an information processing apparatus.

FIG. 38 is a schematic block diagram showing an arrangement of a system wherein the recording apparatus of the present invention is applied to an information processing apparatus having functions of a wordprocessor, a personal computer, a facsimile machine, and a copying machine. In FIG. 38, a controller 701 controls the entire apparatus, and comprises a CPU (e.g., a microprocessor), and various I/O ports. The controller 701 performs its control operations by exchanging control signals, data signals, and the like with the respective units. A display 702 displays various menu data, document information, image data read by an image reader 707, and the like on its display screen. A transparent touch panel 703 of a pressure-sensitive type is arranged on the display 702. When a user depresses the surface of the touch panel 703 with, e.g., his or her finger, he or she can input items, coordinate positions, and the like on the display 702.

An FM (Frequency Modulation) sound source 704 stores music information generated by, e.g., a music editor in a memory 713 or an external memory unit 712 as digital data, reads out the digital data from these memories, and FM-modulates the readout data. Electrical signals from the FM sound source 704 are converted into audible tones by a loudspeaker 705. A printer 706 adopts the recording apparatus according to the present invention as an output terminal for a wordprocessor, a personal computer, a facsimile machine, and a copying machine.

The image reader 707 photoelectrically reads original data, and is arranged along an original convey path. The image reader 707 reads various originals for the facsimile function, copying function, and the like. A facsimile sender/receiver 708 functions to send original data read by the image reader 707, and to receive and decode a sent facsimile signal, and has an interface function with an external device. A telephone set 709 has various telephone functions such as a usual telephone function, an automatic answering function, and the like. The memory 713 comprises a ROM for storing a system program, a manager program, other application programs, character fonts, dictionaries, and the like. The memory 713 stores an application program and character information loaded from the external memory unit 712. The memory 713 also comprises a video RAM.

A keyboard 711 is used for inputting document information, various commands, and the like. The external memory unit 712 comprises a floppy disk or a hard disk as a storage medium. The external memory unit 712 stores character information, music or voice information, user's application programs, and the like.

Figure 39:
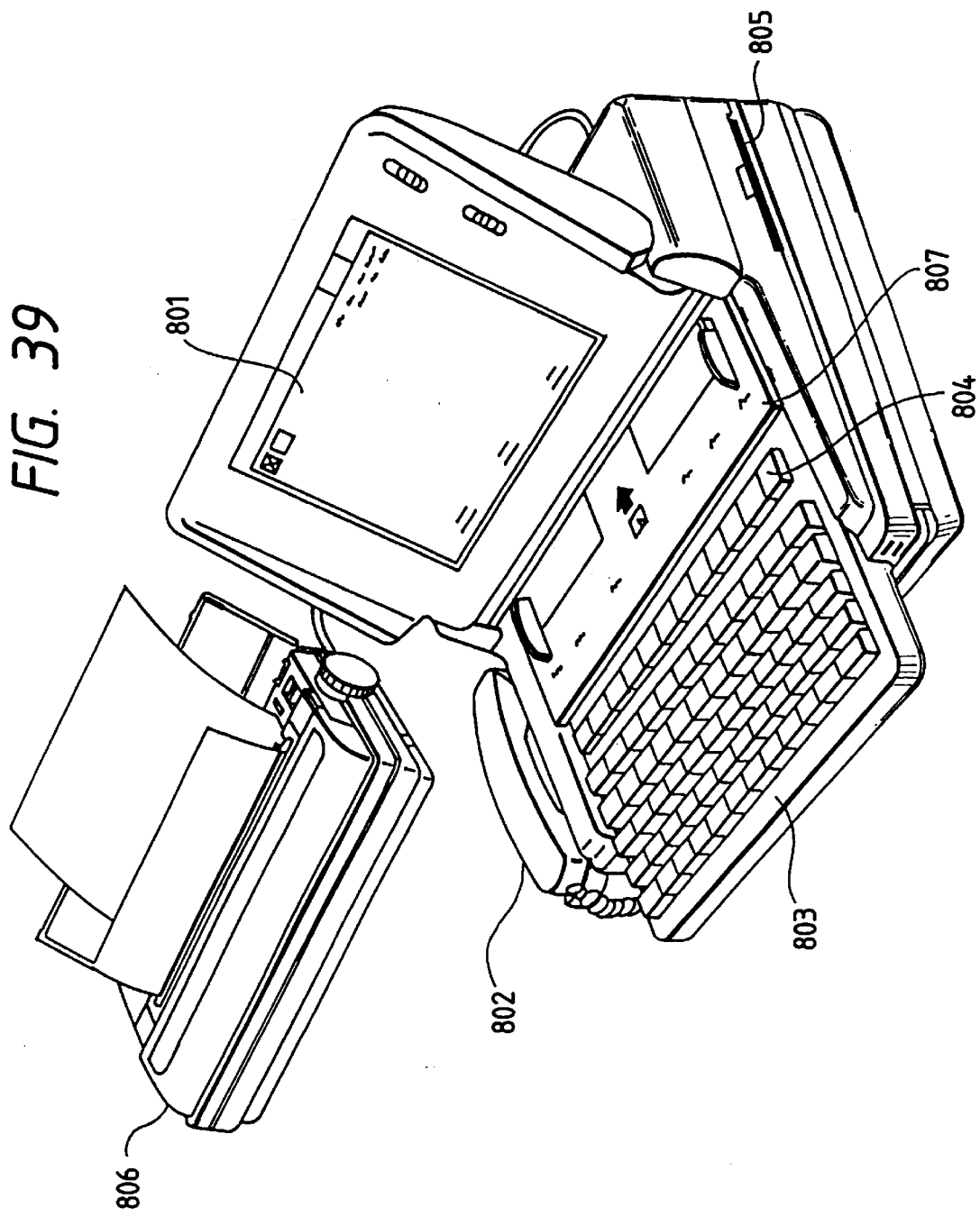
FIG. 39 is a perspective view showing the outer appearance of the information processing apparatus shown in FIG. 38.

FIG. 39 shows the outer appearance of the information processing apparatus shown in FIG. 38. In FIG. 39, a flat panel display 801, which utilizes a liquid crystal, or the like, displays various menu data, figure information, document information, and the like. The touch panel is arranged on the display 801. When the surface of the touch panel is depressed with, e.g., a finger, coordinates, items, and the like can be input. A handset 802 is used when this apparatus is used as a telephone set.

A keyboard 803 is detachably connected to the main body through a cord, and can be used for inputting various kinds of document information, and various data. The keyboard 803 is provided with various function keys 804, and the like. A floppy disk insertion slot 805 is formed on the side surface of the main body.

A paper supporting platen 807 supports an original to be read by the image reader 707. The read original is discharged to the backside of the apparatus. Upon the facsimile reception, or the like, information is recorded by an ink jet printer 806.

Note that the display 801 may comprise a CRT. However, a flat panel display such as a liquid crystal display utilizing a ferroelectric liquid crystal is preferable since a compact, low-profile, and lightweight structure can be realized. When the information processing apparatus functions as a personal computer or a wordprocessor, various kinds of information input from the keyboard 711 in FIG. 38 are processed by the controller 701 according to a predetermined program, and the processed information is output as an image to the printer 706. When the information processing apparatus functions as a receiver of the facsimile machine, facsimile information input from the facsimile sender/receiver 708 through a communication line is received and processed by the controller 701 according to a predetermined program, and output as a received image to the printer 706.

Figure 40:
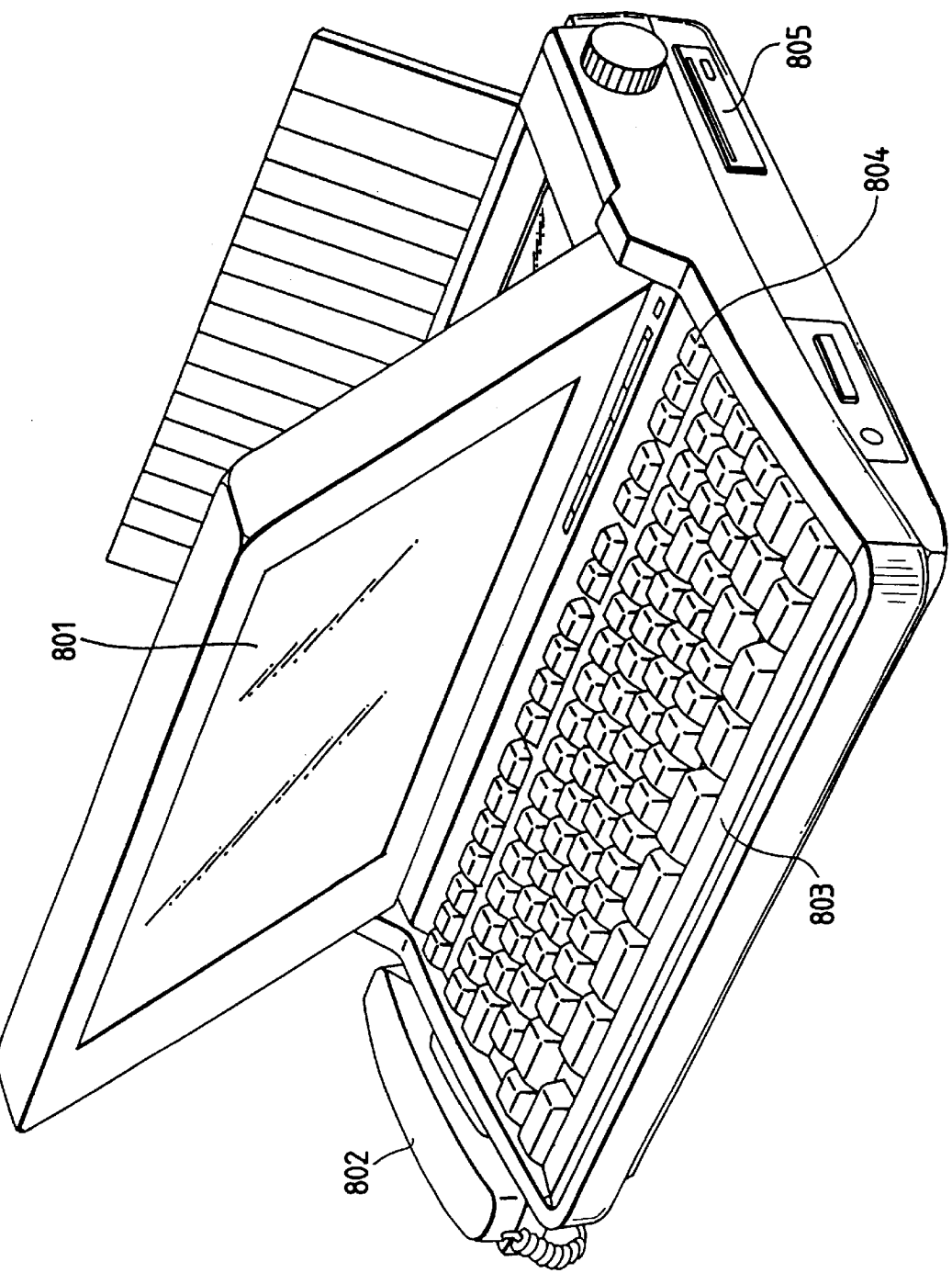
FIG. 40 is a perspective view showing another information processing apparatus.

When the information processing apparatus functions as a copying machine, an original is read by the image reader 707, and the read original data is output to the printer 706 as a copied image through the controller 701. When the information processing apparatus functions as a sender of the facsimile machine, original data read by the image reader 707 is processed by the controller 701 according to a predetermined sending program, and the processed data is then sent onto the communication line through the facsimile sender/receiver 708. Note that the information processing apparatus may be of an integrated type, that incorporates an ink jet printer in the main body, as shown in FIG. 40. In this case, portability can be further improved. In FIG. 40, the same reference numerals denote the same parts as in FIG. 39.

When the recording apparatus of the present invention is applied to the above-mentioned multi-functional information processing apparatus, a high-quality recorded image can be obtained, thus further improving the functions of information processing apparatus.

What is claimed is:

1. An ink jet recording apparatus comprising:
   a recording head adapted for ejecting at least two colors of ink;
   discriminating means for discriminating between character data and bit map data; and
   control means for selecting a character data recording mode or a bit map data recording mode in accordance with a discrimination result by said discriminating means,
   wherein said control means controls an amount of ink per ejection in the bit map data recording mode to be less than that in the character data recording mode.

2. An apparatus according to claim 1, wherein said recording head has an electro-thermal converting element provided near an ink ejection portion.

3. An apparatus according to claim 1, wherein said control means controls the amount of ink per ejection by varying ejection energy supplied to said recording head.

4. An apparatus according to claim 2, wherein said control means controls the amount of ink per ejection by varying a voltage value and/or a pulse of a drive signal applied to the electro-thermal converting element of said recording head.

5. An apparatus according to claim 2, wherein a driving signal supplied to the electro-thermal converting element of said recording head per ejection comprises at least two pulses, and said control means controls the amount of ink per ejection by varying an interval between said two pulses of the driving signal.

6. An apparatus according to claim 5, wherein the two pulses of said driving signal each have a constant voltage and a constant pulse width.

7. An apparatus according to claim 1, wherein said control means controls the amount of ink per ejection by varying a driving signal supplied to said recording head.

8. An apparatus according to claim 1, wherein said ink jet recording apparatus is applicable to a copying machine.

9. An apparatus according to claim 1, wherein said ink jet recording apparatus is applicable to a facsimile machine.

10. An apparatus according to claim 1, wherein said ink jet recording apparatus is applicable to a data processing machine.

11. An apparatus according to claim 1, further comprising carrying means for carrying a recording medium.

12. An apparatus according to claim 1, further comprising recovery means for recovering said recording head.

13. An ink jet recording method of performing a recording using a recording head adapted for ejecting at least two colors of ink, the method comprising the steps of:
   discriminating between character data and bit map data;
   ejecting an ink per injection with a first amount of ink when a discrimination result in said discriminating step identifies the bit map data; and
   ejecting an ink per injection with a second amount of ink when a discrimination result in said discriminating step identifies the-character data, the first amount of ink being less than the second amount of ink.

14. A method according to claim 13, wherein said recording head has an electro-thermal converting element provided near an ink ejection portion.

15. A method according to claim 14, wherein said two ejection steps each control the amount of ink per ejection by varying a voltage value and/or a pulse of a drive signal applied to the electro-thermal converting element of said recording head.

16. A method according to claim 14, wherein a driving signal supplied to the electro-thermal converting element of said recording head per ejection comprises at least two pulses, and said two ejection steps each control the amount of ink per ejection by varying an interval between said two pulses of the driving signal.

17. A method according to claim 16, wherein said two pulses each have predetermined a constant voltage and a constant pulse width.

18. A method according to claim 13, wherein said two ejection steps each control the amount of ink per ejection by varying ejection energy supplied to said recording head.

19. A method according to claim 13, wherein said two ejection steps each control the amount of ink per ejection by varying a driving signal supplied to said recording head.

20. An ink jet recording apparatus for performing recording using a recording head for ejecting an ink, comprising:
   discrimination means for discriminating a type of recording data recorded by said recording head; and
   ejection quantity control means for controlling an ejection quantity of the ink ejected from said recording head according to the type of recording data discriminated by said discrimination means,
   wherein said ejection quantity control means controls the ejection quantity of the ink by maintaining a temperature of said recording head at a predetermined temperature,
   wherein said discrimination means discriminates whether the recording data recorded by said recording head is character data or image data, and
   wherein said ejection quantity control means sets a larger ejection quantity for recording a character than for recording an image.

21. A method for reducing a mixed color produced from a plurality of inks at a record position for a bit map data on a recording medium containing a record portion for the bit map data and a record portion for a character data, said method comprising the steps of:
   providing a recording head for ejecting at least two colors of the inks;
   discriminating between the character data and the bit map data; and
   driving the recording head to eject the inks onto the recording medium such that an ejection amount of at least one of the inks per ejection in recording based on the bit map data is less than an ejection amount of at least one of the inks in recording based on the character data, thereby recording an image containing the record portion for the bit map data and the record portion for the character data.

* * * * *

UNITED STATES PATENT AND TRADEMARK OFFICE
CERTIFICATE OF CORRECTION

PATENT NO. : 6,007,174
DATED : December 28, 1999
INVENTOR(S) : HIROMITSU HIRABAYASHI ET AL.

It is certified that error appears in the above-identified patent and that said Letters Patent is hereby corrected as shown below:

COLUMN 1

Line 15, "apparauts" should read --apparatus--.

COLUMN 8

Line 34, "member" should read --material--.

COLUMN 9

Line 32, "thin" should read --thinned--.

COLUMN 11

Line 11, "eject" should read --ejection--;
Line 17, "eject" should read --ejection--; and
Line 22, "achievabel" should read --achievable--.

COLUMN 13

Line 22, "eject" should --ejection--; and
Line 23, "eject" should read --ejection--.

UNITED STATES PATENT AND TRADEMARK OFFICE
CERTIFICATE OF CORRECTION

PATENT NO. : 6,007,174
DATED : December 28, 1999
INVENTOR(S) : HIROMITSU HIRABAYASHI ET AL.

It is certified that error appears in the above-identified patent and that said Letters Patent is hereby corrected as shown below:

COLUMN 14

Line 65, "eject" should read --ejection--.

COLUMN 19

Line 8, "eject" should read --ejection--.

COLUMN 21

Line 30, "$T_{11}$" should read --$T_{11MIN}$--;
Line 31, Before "$T_{12MAX}$," --$T_{2MAX}$-- should be inserted; and
Line 32, "$T_{11MAX}$," should read --$T_{11MIN}$,--.

COLUMN 22

Line 42, "in units of" should read --for respective--.

UNITED STATES PATENT AND TRADEMARK OFFICE
CERTIFICATE OF CORRECTION

PATENT NO. : 6,007,174
DATED : December 28, 1999
INVENTOR(S) : HIROMITSU HIRABAYASHI ET AL.  Page 3 of 3

It is certified that error appears in the above-identified patent and that said Letters Patent is hereby corrected as shown below:

COLUMN 32

Line 1, "per injection" should be deleted and "of ink" should read --of ink per ejection--;
Line 4, "per injection" should be deleted and "of ink" should read --of ink per ejection--; and
Line 5, "the-character" should read --the character--.

Signed and Sealed this

Twenty-third Day of January, 2001

Attest:

Q. TODD DICKINSON

Attesting Officer    Commissioner of Patents and Trademarks